United States Patent [19]

Kurita et al.

[11] Patent Number: 5,279,114
[45] Date of Patent: Jan. 18, 1994

[54] APPARATUS FOR DETECTING DETERIORATION OF CATALYST OF INTERNAL COMBUSTION ENGINE

[75] Inventors: Noriaki Kurita, Nagoya; Shuji Sakakibara, Okazaki; Hideki Suzuki, Aichi; Katsuhiko Kodama, Toyota, all of Japan

[73] Assignee: Nippondenso Co., Ltd., Kariya, Japan

[21] Appl. No.: 996,811

[22] Filed: Dec. 23, 1992

[30] Foreign Application Priority Data

Dec. 27, 1991 [JP] Japan .................. 03-347300

[51] Int. Cl.$^5$ ............................. F01N 3/28
[52] U.S. Cl. ....................... 60/276; 60/277; 123/691; 123/692
[58] Field of Search ............. 60/276, 277; 123/691, 123/692

[56] References Cited

U.S. PATENT DOCUMENTS

| 3,962,866 | 6/1976 | Neidhard et al. ............ 60/277 |
| 5,154,055 | 10/1992 | Nakane et al. ............. 60/277 |
| 5,207,057 | 5/1993 | Kayanuma .................. 123/692 |
| 5,220,788 | 6/1993 | Kurita ..................... 60/274 |
| 5,228,287 | 7/1993 | Kuronishi ................. 123/692 |

FOREIGN PATENT DOCUMENTS

| 49-109721 | 10/1974 | Japan . |
| 63-128221 | 8/1988 | Japan . |
| 8332 | 1/1989 | Japan .................. 123/692 |
| 31544 | 2/1991 | Japan .................. 123/692 |

OTHER PUBLICATIONS

Koupal et al, "Detection of Catalyst Failure On-Vehicle Using the Dual Oxygen Sensor Method", SAE Technical Paper Series, 910560, Feb., 1991. pp. 135-146.

Primary Examiner—Douglas Hart
Attorney, Agent, or Firm—Cushman, Darby & Cushman

[57] ABSTRACT

Disclosed is an apparatus for detecting deterioration of a catalyst of an internal combustion engine having a plurality of cylinder banks in such a manner that the deterioration of the catalyst can be assuredly discriminated regardless of the presence of deviation of a control phase with respect to each cylinder bank. The influence of change of the air/fuel ratio can be eliminated considerably by reducing the air/fuel ratio correction coefficient for a right bank, or by also using the correction coefficient for the left bank as that for the right bank to cause the phases of them to be synchronized with each other, or by dither-controlling the right bank. Therefore, the change of the air/fuel ratio with respect to the left bank can be assuredly detected while necessitating one sub air/fuel ratio sensor. By discriminating the state of deterioration of the catalyst in accordance with results of detections made by the left air/fuel ratio sensor and the sub air/fuel ratio sensors, the deterioration of the catalyst can be assuredly discriminated regardless of the presence of deviation of control phase with respect to the two banks.

4 Claims, 18 Drawing Sheets

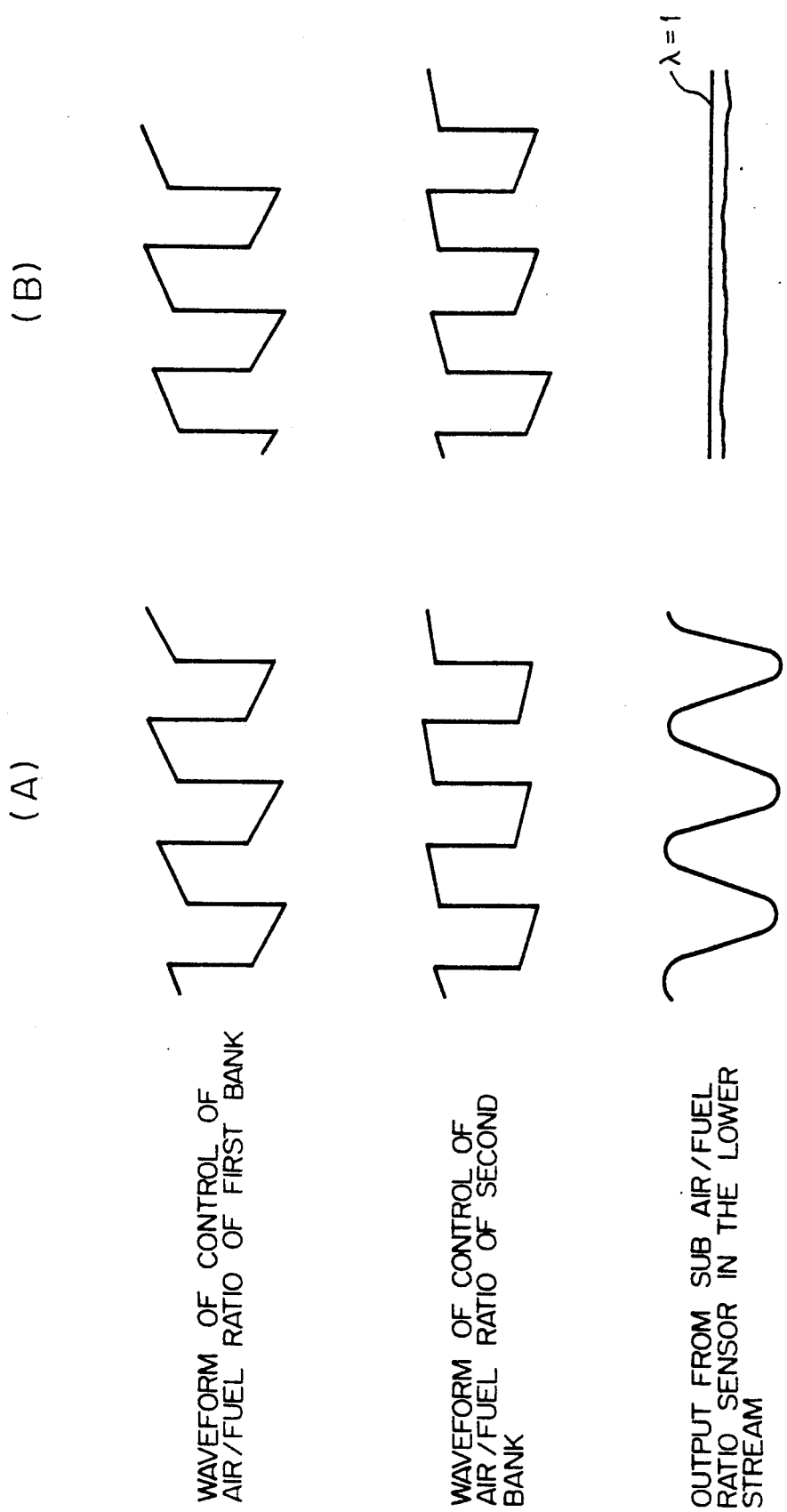

APPARATUS FOR DETECTING DETERIORATION OF CATALYST OF INTERNAL COMBUSTION ENGINE

BACKGROUND OF THE INVENTION

1. Field of the Invention

The present invention relates to an apparatus for detecting deterioration of a catalyst of an internal combustion engine in which a main air/fuel ratio sensor is disposed in each exhaust system of a plurality of cylinder banks, and a sub air/fuel ratio sensor is disposed in the lower stream from a catalyst provided in a collecting exhaust pipe of the cylinders, the apparatus being arranged to detect the deterioration of the catalyst in accordance with the results of detections performed by the main air/fuel ratio sensors and the sub air/fuel ratio sensor.

2. Description of the Prior Art

Hitherto, an internal combustion engine has been provided with main air/fuel ratio sensors in the upper stream from the ternary catalyst to feedback-control the air/fuel ratio in order to improve the purification efficiency of the ternary catalyst disposed in the exhaust system thereof and to improve the fuel consumption efficiency. However, the main air/fuel ratio sensor disposed in the upper stream from the ternary catalyst easily deteriorates due to heat. Therefore, a so-called double sensor system is constituted by additionally providing a sub air/fuel ratio sensor in the lower stream from the ternary catalyst so as to cause the sub air/fuel ratio sensor in the lower stream to supervise the control of the main air/fuel ratio sensor in the upper stream, so that a correction is performed.

In an internal combustion engine of the aforesaid type, the deterioration of the catalyst is discriminated in accordance with the results of the detection operations performed by the main air/fuel ratio sensors and the sub air/fuel ratio sensor. For example, there have been a known method which employs the frequency ratio by using the outputs from the two air/fuel ratio sensors as parameters (refer to Japanese Utility Model Laid-Open No. 63-128221), a method which employs the amplitude ratio (refer to U.S. Pat. No. 3,962,866), and a method which employs the area ratio (refer to SAE910561).

There is sometimes also employed the double sensor system in a V-type engine having two cylinder banks and two exhaust manifolds. The aforesaid V-type engine is, due to this structural requirement, constituted in such a manner that a catalyst is disposed in a collecting exhaust pipe which combines the two exhaust systems and a sub air/fuel ratio sensor is disposed in the lower stream from the catalyst in order to decrease the number of the sub air/fuel ratio sensor disposed in the lower stream. Furthermore, supervision of the air/fuel ratio feedback control of each cylinder bank performed by the two main air/fuel ratio sensors disposed in the upper stream is carried out by one sub air/fuel ratio sensor disposed in the lower stream.

Hence, in the V-type engine, the deterioration of the aforesaid catalyst has been discriminated in accordance with the results of the detection performed by either of the main air/fuel ratio sensors disposed in the upper stream and the sub air/fuel ratio sensor disposed in the lower stream.

Therefore, in the V-type engine, the sub air/fuel ratio sensor disposed in the lower stream detects the composition of the mixture gases exhausted from the two exhaust systems. In a case where the control phase of the first bank and that of the second bank coincide with each other as shown in (A) of FIG. 20, the same density gases, that is, two rich gases or two lean gases are mixed with each other in the collecting exhaust pipe in such a manner that if a rich gas is exhausted from one of the two exhaust systems, also a rich gas is exhausted from the other exhaust system, and if a lean gas is exhausted from one of the exhaust systems, also a lean gas is exhausted from the other system. Therefore, the waveform can be measured by the sub air/fuel ratio sensor disposed in the lower stream.

However, the fact that the air/fuel ratio feedback control is performed for each bank will cause a problem to arise in that the rich gas and the lean gas air mixed with each other to become a gas having an air/fuel ratio of $\lambda=1$ in the collecting exhaust pipe if the control phases of the two bank become different from each other and the exhaust air/fuel ratios become different in the opposite directions as shown in (B) of FIG. 20. If no amplitude is attained in the waveforms detected by the sub air/fuel ratio sensor as described above, the discrimination whether or not the catalyst has deteriorated cannot be made.

SUMMARY OF THE INVENTION

Accordingly, an object of the present invention is to provide an apparatus for detecting deterioration of a catalyst of an internal combustion engine which is capable of overcoming the aforesaid problem, which is adapted to an internal combustion engine having a plurality of cylinder banks, and which is capable of assuredly discriminating deterioration of a catalyst while having only one sub air/fuel ratio sensor disposed in the lower stream with respect to a plurality of the banks even if the control phases become different between a plurality of the banks.

According to the present invention, there is provided an apparatus for detecting deterioration of a catalyst of an internal combustion engine having:

a plurality of exhaust passages respectively connected to a plurality of cylinder banks;

A collecting exhaust pipe to which the exhaust passages are joined; and a catalyst disposed in the collecting exhaust pipe and capable of purifying exhaust gas, the apparatus for detecting deterioration of a catalyst comprising:

a plurality of main air/fuel ratio sensors respectively disposed in the exhaust passages;

a sub air/fuel ratio sensor disposed in the lower stream from the catalyst disposed in the collecting exhaust pipe;

a feedback control means for executing a feedback control of the air/fuel ratio of each cylinder bank in accordance with the results of detections performed by the main air/fuel ratio sensors and the sub air/fuel ratio sensor;

deterioration discriminating means for discriminating the deterioration state of the catalyst in accordance with results of detections performed by the main air/fuel ratio sensor corresponding to a predetermined cylinder bank and the sub air/fuel ratio sensor; and influence eliminating means which adjusts the air/fuel ratio control quantity at the time of feedback-controlling the air/fuel ratio so as to eliminate an influence of exhaust gas emitted from cylinder banks except for the predetermined cylinder bank of a plurality of the cylinder banks.

The influence eliminating means may reduce an air/fuel correction coefficients of the cylinder banks except for the predetermined cylinder bank at the time of feedback-controlling the air/fuel ratio so as to eliminate the influence of the change of the air/fuel ratio, or may use an air/fuel ratio correction coefficient of the predetermined cylinder bank as the air/fuel ratio correction coefficients for the other cylinder banks at the time of feedback controlling the air/fuel ratio so as to cause the phases of the main air/fuel ratio sensors to be synchronized with one another, so that the influence of the change of the air/fuel ratio is eliminated, or may subject the cylinder banks except for the predetermined cylinder bank to a dither control in which the air/fuel ratio is changed relative to a target air/fuel ratio, so that the influence of the change of the air/fuel ratio is eliminated.

By using the catalyst deterioration detection apparatus according to the present invention, the influence of the change of the air/fuel ratio taken place due to the exhaust gas emitted from the cylinder banks except for a predetermined cylinder bank among a plurality of the cylinder banks can be considerably eliminated.

As described above, the influence of the change of the air/fuel ratio can be considerably eliminated by reducing, at the time of feedback controlling the air/fuel ratio, the air/fuel ratio correction coefficients for the cylinder banks except for the predetermined cylinder bank, or by also using the air/fuel ratio correction coefficient for a predetermined cylinder bank for use at the time of feedback controlling the air/fuel ratio as that for the other cylinder banks so as to cause the phases of the output characteristic change from the main air/fuel ratio sensors to be synchronized with one another, or by subjecting a predetermined cylinder bank to a dither control in which the air/fuel ratio is changed while traversing a target air/fuel ratio. Therefore, the sub air/fuel ratio sensor disposed in the lower stream from the catalyst is able to assuredly detect the change of the air/fuel ratio of a predetermined cylinder bank.

Since the deterioration discriminating means discriminates the state of deterioration of the catalyst in accordance with the results of detections performed by the main air/fuel ratio sensors corresponding to the predetermined cylinder banks and the sub air/fuel ratio sensor, the deterioration of the catalyst can be assuredly discriminated regardless of the presence of deviation of the control phase of the cylinder banks.

BRIEF DESCRIPTION OF THE DRAWINGS

FIG. 20 illustrates a conventional technology, where (A) illustrates waveforms realized when the control phases of the two banks coincide with each other; and (B) illustrates waveforms realized when the control phases of the two banks are deviated from each other.

DETAILED DESCRIPTION OF THE PREFERRED EMBODIMENT

Preferred embodiments of the present invention will now be described.

Figure 1:
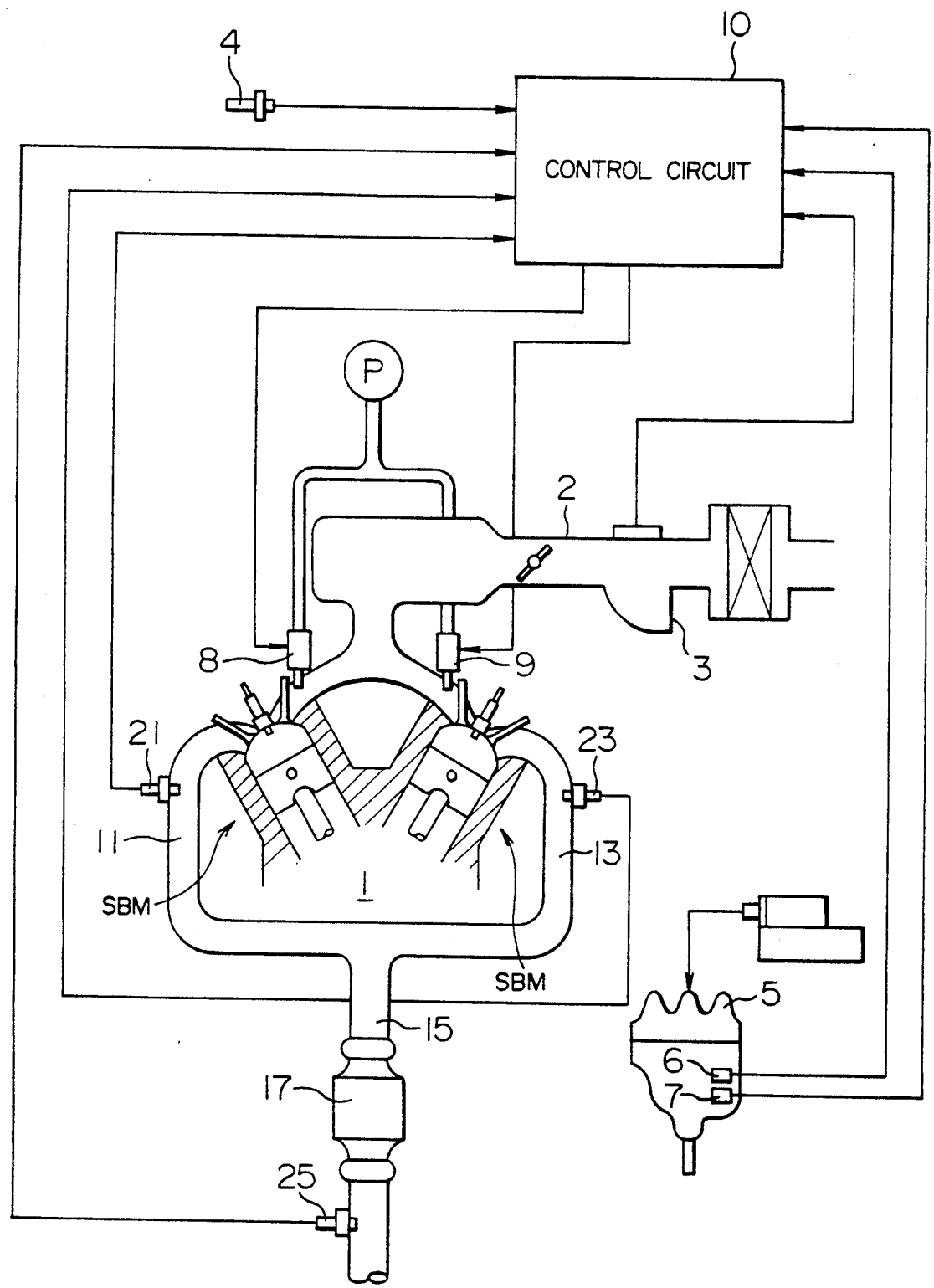
FIG. 1 is an overall schematic view which illustrates an embodiment of an apparatus for detecting deterioration of a catalyst of an internal combustion engine according to the present invention.

FIG. 1 is an overall schematic view which illustrates an embodiment in which an apparatus for detecting deterioration of a catalyst of an internal combustion engine according to the present invention is adapted to a V-type 6-cylinder engine (hereinafter abbreviated to an "engine"). As shown in FIG. 1, six cylinders of an engine 1 are arranged in two lines which form a V-shape in such a manner that three cylinders of the six cylinders form either of a pair of cylinder banks, the pair being composed of a right cylinder bank SBM and a left cylinder bank SBH. An air flow meter 3 is disposed in a suction passage 2 of the engine 1, the air flow meter 3 being used for the purpose of directly measuring the quantity of sucked air and having a potentiometer so as to generate an electric signal of an analog voltage level which is in proportion to the sucked air quantity.

Furthermore, a water temperature sensor 4 for detecting the temperature of cooling water is provided for a water jacket (omitted from illustration) of the cylinder block of the engine 1. The water temperature sensor 4 generates an electric signal of an analog voltage level which is in proportion to the temperature of cooling water.

A distributor 5 has two rotational-angle sensors 6 and 7 which generate angular position signals whenever its shaft is rotated by angular degrees of, for example 360°, respectively, when converted into a crank angle. The angular position signals generated by the rotational angle sensors 6 and 7 serve as an interrupt request signal for a fuel injection time calculation routine, a reference timing signal for the ignition timing, an interrupt request signal for an ignition timing calculation routine, and the like.

Furthermore, the suction passage 2 is provided with fuel injection valves 8 and 9 for each cylinder, the fuel injection valve 8 and 9 being arranged to supply pressurized fuel from a fuel supply system to a suction port. The fuel injection valve 8 is provided for the left bank SBH, while the fuel injection valve 9 is provided for the right bank SBM.

Since the exhaust system of the engine 1 is provided for each of the right and left banks SBM and SBH, it is sectioned into two exhaust passages 11 and 13. The two exhaust passages 11 and 13 are joined together at a collecting exhaust pipe 15. The collecting exhaust pipe 15 has a catalyst converter 17 (hereinafter abbreviated to a "catalyst") filled with a ternary catalyst. The catalyst converter 17 equally receives exhaust gases from the right and the left banks SBM and SBH so as to simultaneously purify three harmful components HC, CO and NOx contained in the exhaust gas.

The right and left banks SBM and SBH have corresponding main air/fuel ratio sensors 21 and 23 which respectively generate electric signals which correspond to the density of the oxygen component contained in the exhaust gas. The main air/fuel ratio sensors 21 and 23 are ordinary oxygen density sensors each of which generates a binary output voltage, the level of which depends upon the fact that the air/fuel ratio is rich or lean with respect to a theoretical air/fuel ratio. Furthermore the collecting exhaust pipe 15 has a sub air/fuel ratio sensor 25 in the lower stream from the catalyst converter 17.

A control circuit 10 processes signals supplied from the air flow meter 3, the water temperature sensor 4, the rotational angle sensors 6 and 7, the main air/fuel ratio sensors 21 and 23, and the sub air/fuel ratio sensor 25 so as to control the fuel injection, the control circuit 10 being composed of, for example, a microcomputer.

Figure 2:
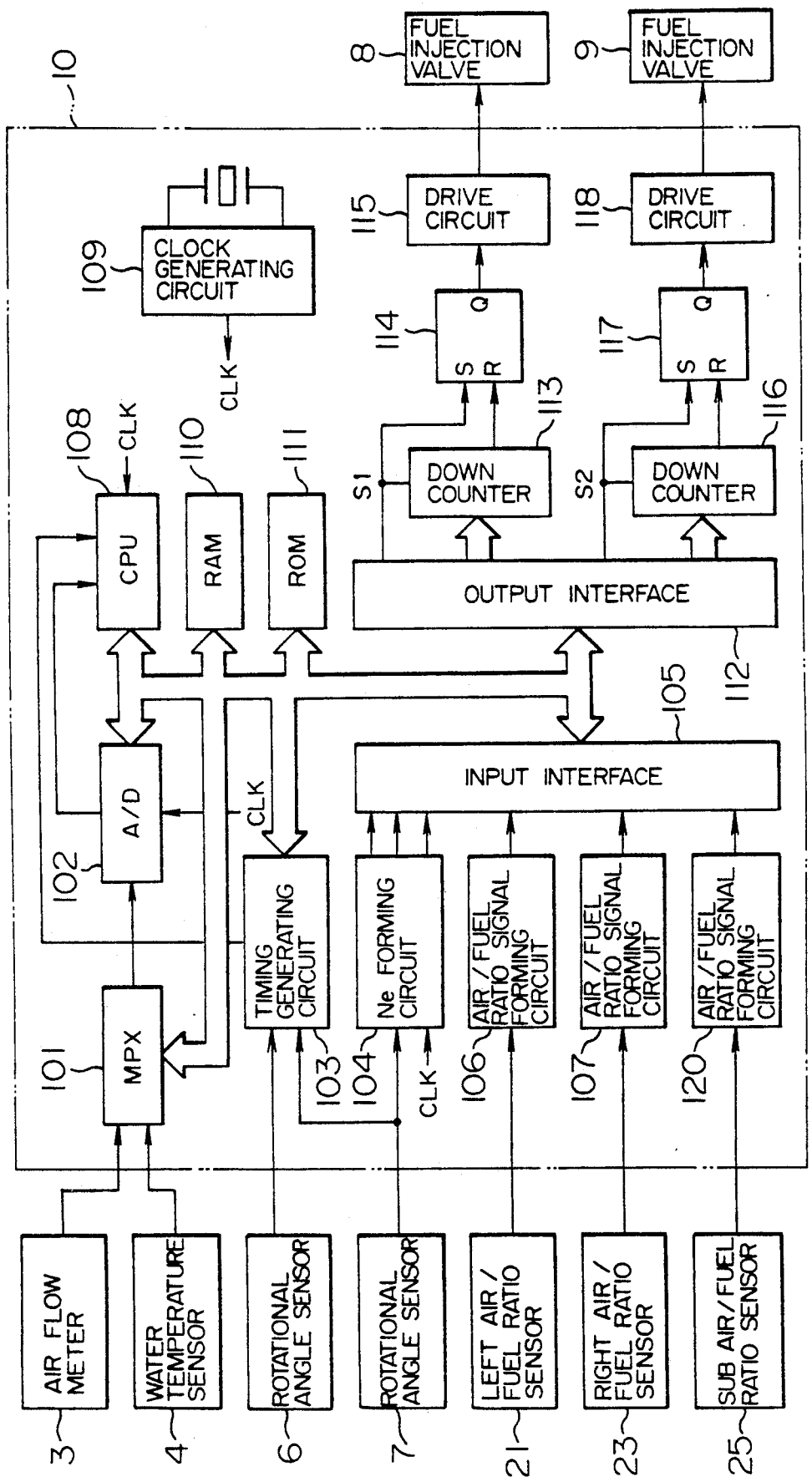
FIG. 2 is a block diagram which illustrates a control device according to this embodiment.

FIG. 2 is a detailed block diagram which illustrates the control circuit. Referring to FIG. 2, each of analog signals transmitted from the air flow meter 3 and the water temperature sensor 4 is supplied to an A/D converter 102 via a multiplexer 101. That is, the A/D converter 102 utilizes a clock signal CLK transmitted from a clock generating circuit 109 to A/D-convert analog output signals from the air flow meter 3 and the water temperature sensor 4 supplied via the multiplexter 101 which is selectively controlled by a CPU 108, the A/D converter 102 being arranged to transmit a digital interrupt signal to the CPU 108 after the analog-to-digital conversion has been completed. As a result, recent data items of the air flow meter 3 and the water temperature sensor 4 are, in an interruption routine, received so as to be stored in a predetermined region of a RAM 110.

Each of pulse signals transmitted from the rotational angle sensors 6 and 7 is supplied to a timing generating circuit 103 which generates an interrupt request signal and a reference timing signal. The timing generating circuit 103 includes a timing counter, the count of which is sequentially increased in response to each 30° CA pulse signal supplied from the rotational angle sensor 7, and which is reset in response to each 360° CA pulse signal supplied from the rotational angle sensor 6. The pulse signal transmitted from the rotational angle sensor 7 is supplied to a predetermined position of an input interface 105 via a rotational speed forming circuit 104. The rotational speed forming circuit 104 comprises a gate, which is opened/closed at each 30° CA, and a counter for counting the number of Pulses of the clock signals CLK which has been generated by the clock generating circuit 109 and which pass through the aforesaid gate, so that a binary signal which is in inverse proportion to the rotational speed of the engine is formed.

An output signal from the main air/fuel ratio sensor (hereinafter also called a "left air/fuel ratio sensor") 21 for the left bank SBH is supplied to an air/fuel ratio signal forming circuit 106, while an output signal from the main air/fuel ratio sensor (hereinafter also called a "left air/fuel ratio sensor") 23 for the right bank SBM is supplied to an air/fuel ratio signal forming circuit 107. Furthermore, an output signal from the sub air/fuel ratio sensor 25 is supplied to an air/fuel ratio signal forming circuit 120.

Each of the air/fuel ratio signal forming circuits 106, 107 and 120 has a comparator for subjecting output voltage from each of the air/fuel ratio sensors 21, 23 and 25 to a comparison with reference voltage, and a latch circuit for latching the output from the comparator so as to generate an air/fuel ratio signal of a binary value "1" or "0" depending upon the face that the air/fuel ratio of the engine is lean or rich with respect to the theoretical air/fuel ratio.

A RAM 111 previously stores a main routine, a fuel injection quantity calculation control routine, an ignition timing calculation control routine, programs for an influence eliminating control process to be described later and the like, variety of fixed data items required to perform the aforesaid processes, and constants.

The CPU 108 transmits, to a predetermined position of the output interface 112, fuel injection quantity data (time) for the right and left banks SBM and SBH calculated by the fuel injection quantity calculation control routine to be described later, the aforesaid data being transmitted together with strope signals S1 and S2. As a result, each fuel injection quantity data is preset in down-counters 113 and 116, and also flip-flops 114 and 117 are set.

Each of drive circuits 115 and 118 actuates the fuel injection valves 8 for the left bank SBH and the fuel injection valve 9 for the right bank SBM. On the other hand, each of the down-counters 113 and 116 counts the clock signals CLK generated by the clock generating circuit 109, causing the levels of their carry-out terminals being made to be "1". Hence, the flip-flops 114 and 117 are reset, causing the drive circuits 115 and 118 to stop actuating the fuel injection valve 8 and 9. That is, the fuel injection valves 8 and 9 are actuated for the aforesaid fuel injection time, causing fuel of a quantity, which corresponds to the fuel injection time, to be supplied to the combustion chambers for the right and left banks SBM and SBH of the engine 1.

Then, the operation of this embodiment will now be described. Prior to making a description about the operation to be performed when the deterioration of the catalyst is detected, the description will be, with reference to FIGS. 3 to 6, made about the operation to be performed when the air/fuel ratio feedback control is performed in the V-type internal combustion engine according to this embodiment and having the main air/fuel ratio sensors 21, 23 and the sub air/fuel ratio sensor 25 which are individually disposed in the upper and lower streams from the catalyst converter 17.

The air/fuel ratio feedback control process is an ordinary feedback control process to which the right and left cylinder banks SBM and SBH are respectively subjected. That is, a standard injection quantity to be injected by the fuel injection valve is calculated in accordance with the quantity of air sucked by the engine 1 (or the pressure of sucked air) and the rotational speed. Then, the standard injection quantity is corrected with an air/fuel ratio correction coefficient FAF calculated in accordance with a detection signal transmitted from an oxygen sensor which detects the density of a specific component, for example, the oxygen component, contained in the exhaust gas from the engine 1. In accordance with the corrected injection quantity, the quantity of fuel to be actually supplied is controlled. The aforesaid control process is repeated, so that the air/fuel ratio of the engine is finally converged to a predetermined range.

By performing the aforesaid air/fuel ratio feedback control, the air/fuel ratio can be brought into a very narrow range in the neighborhood of the theoretical air/fuel ratio. That is, the air/fuel ratio for the left bank SBH is controlled by using the obtained air/fuel ratio correction coefficient FAF in such a manner that the air/fuel ratio correction coefficient FAF is obtained by detecting whether the air/fuel ratio obtained by the output from the left air/fuel ratio sensor 21 is rich or lean by utilizing the output from the left air/fuel ratio sensor 21 and that from the sub air/fuel ratio sensor 25, and the inversion moment of the aforesaid states is detected by using a delay time adjusted from the output from the sub air/fuel ratio sensor 25.

Figure 3:
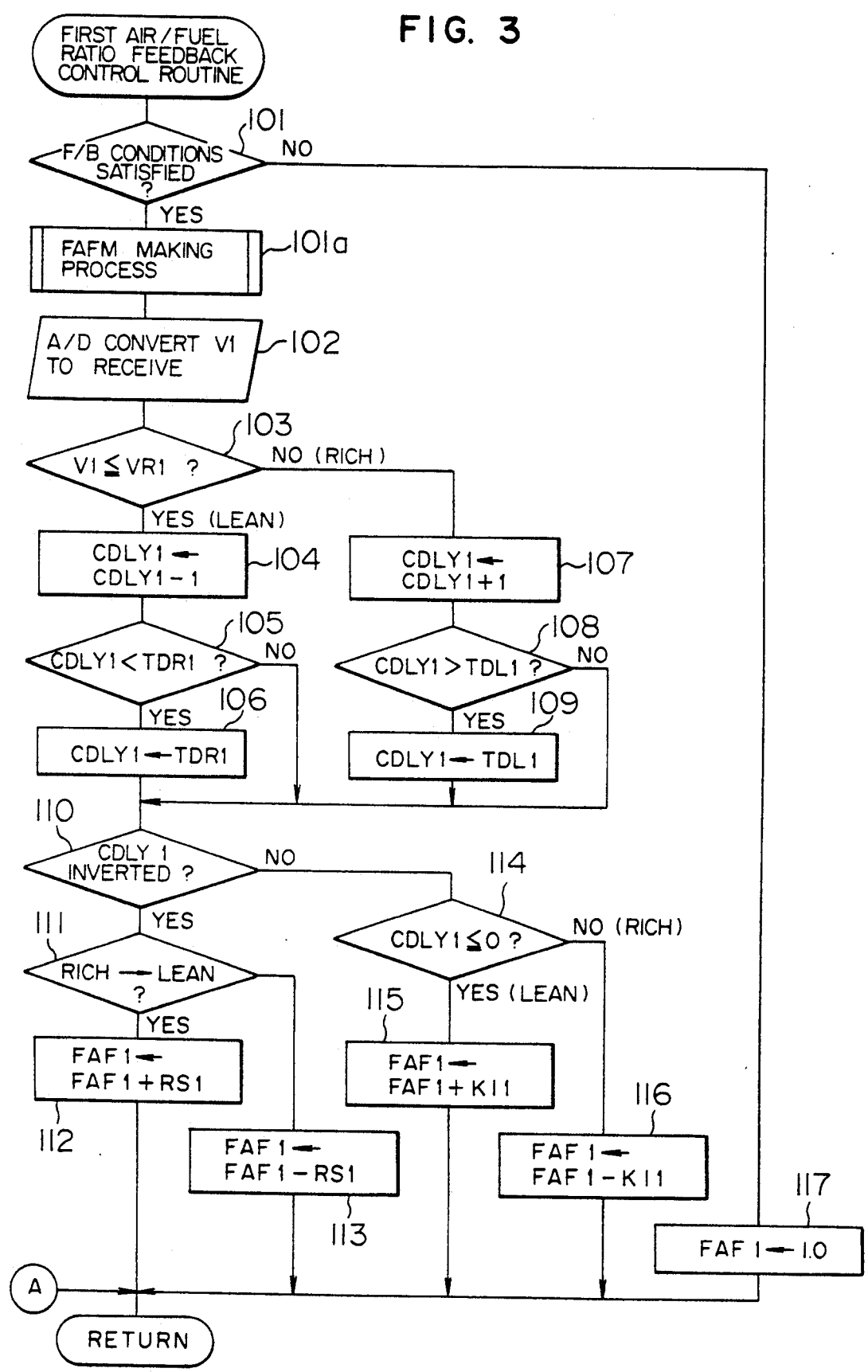
FIG. 3 is a flow chart which illustrates a first air/fuel ratio feedback control routine to be executed in the control device.

Then, the air/fuel ratio feedback control for the left bank SBH will now be mainly described. FIG. 3 is a flow chart which illustrates a first air/fuel ratio feedback control routine for calculating air/fuel ratio correction coefficient FAF1 in accordance with the output from the left air/fuel ratio sensor 21, the first air/fuel ratio feedback control routine being executed at predetermined time intervals of, for example, 4 ms.

In step 101, a discrimination is made as to whether or not conditions for feedback-controlling the air/fuel ratio of the left air/fuel ratio sensor 21 are satisfied. The feedback conditions are not satisfied when the engine is being started, when the fuel increased operation is being performed after the engine has been started, when the fuel-increased operation is being performed during the engine warming up process, when the fuel increased operation is being performed for the purpose of enlarging the power, when a lean control is being performed, and when the left air/fuel ratio sensor 21 is in an inactive state. A closed loop is established in the other cases.

The discrimination as to whether the left air/fuel ratio sensor 21 is active or inactive is made by discriminating as to whether or not water temperature data THW recorded to RAM 110 temporarily holds a relationship THW≧70° C. As an alternative to this, it is discriminated by making a discrimination as to whether or not the level of the output from the left air-fuel ratio sensor 21 has been once moved up and down. If the feedback conditions are not satisfied, the flow proceeds to step 117 in which the air/fuel ratio correction coefficient FAF1 is made to be 1.0, and this routine is completed here.

If the feedback conditions are not satisfied, the flow proceeds to step 102. Although the flow for the left bank SBH proceeds to step 102 as described above, the flow for the air/fuel ratio feedback control of the right bank SBM proceeds to step 102 after the feedback conditions have been satisfied in step 101 and an FAFM making process 101a has been executed in the case of a second embodiment and a third embodiment to be described later in which an influence eliminating control process is performed.

In step 102, output V1 from the left air/fuel ratio sensor 21 is A/D-converted, and the output V1 in the form of digital data is received. In step 103, a discrimination is made as to whether or not V1 is lower than a comparative voltage VR1, for example, 0.45V. That is, whether or not the air/fuel ratio is rich or lean is discriminated.

Figure 4:
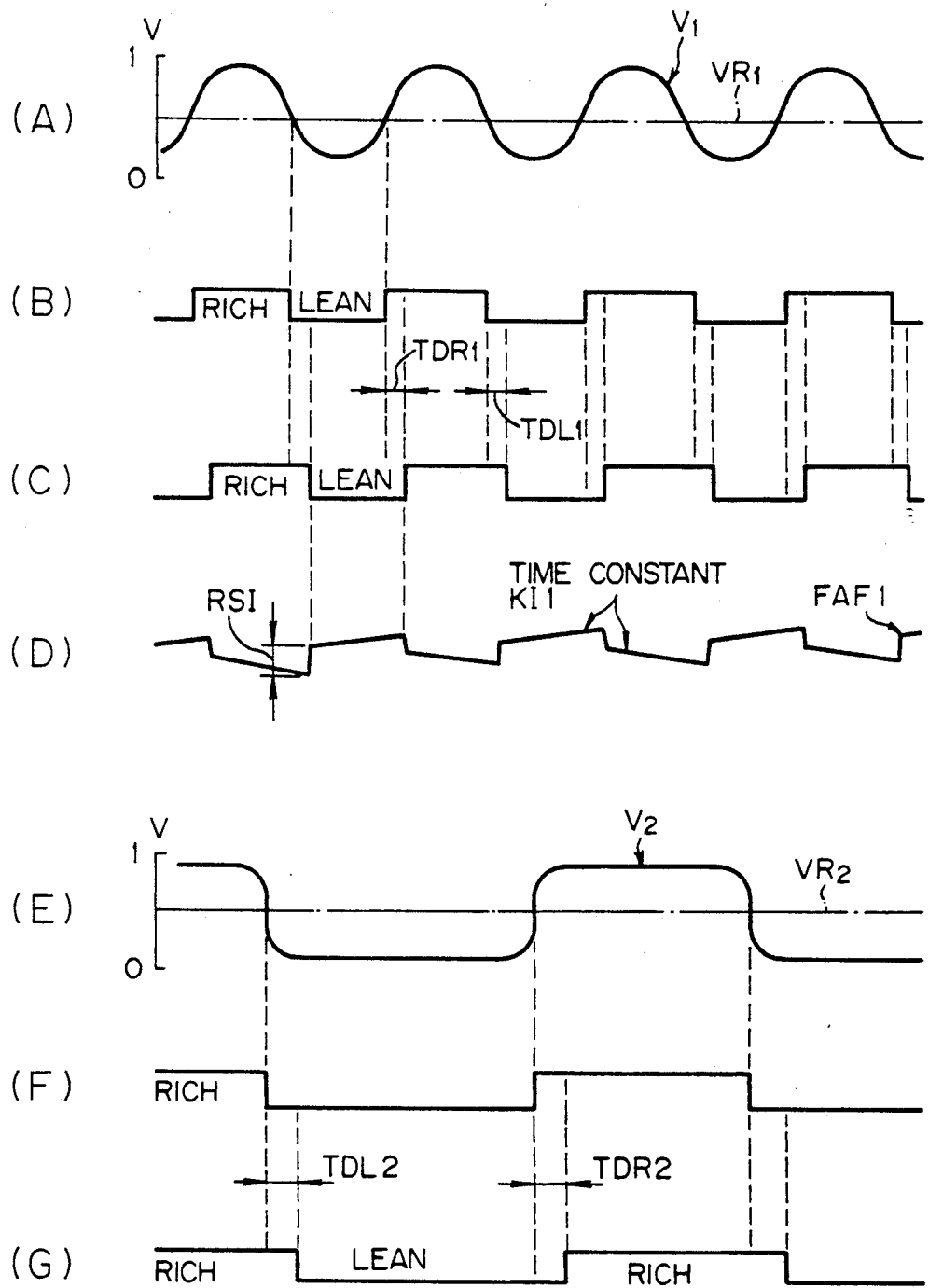
FIG. 4 is a view which illustrates waveforms for use to discriminate the air/fuel ratio state realized when the air/fuel ratio is feedback-controlled.

FIG. 4 illustrates an example of waveforms for use to discriminate the state of the air/fuel ratio. Assuming that the output V1 from the left air/fuel ratio sensor 21 is formed into the waveform shown in (A) of FIG. 4, the aforesaid waveform is subjected to a comparison with reference comparative voltage VR1. If the waveform of the output V1 is higher than the comparative voltage VR1, a discrimination is made that the subject air/fuel ratio is rich state. In the contrary case, a discrimination is made that the air/fuel ratio is lean state. In accordance with the discrimination thus made, voltage, the level of which corresponds to the aforesaid state, is transmitted. The aforesaid waveform is shown in (B) of FIG. 4. If a discrimination is made that the air/fuel ratio is lean (V1≦VR1), the count of a delay counter CDLY1 for the left side is decreased in step 104, and the delay counter CDLY1 for the left side is guarded with minimum value TDR1 in steps 105 and 106. It should be noted that the minimum value TDR1 is a rich delay time defined by a negative value for use to maintain the discrimination that the subject state is the lean state even if the output from the left air/fuel ratio counter 21 has been changed from the lean state to the rich state.

Figure 5:
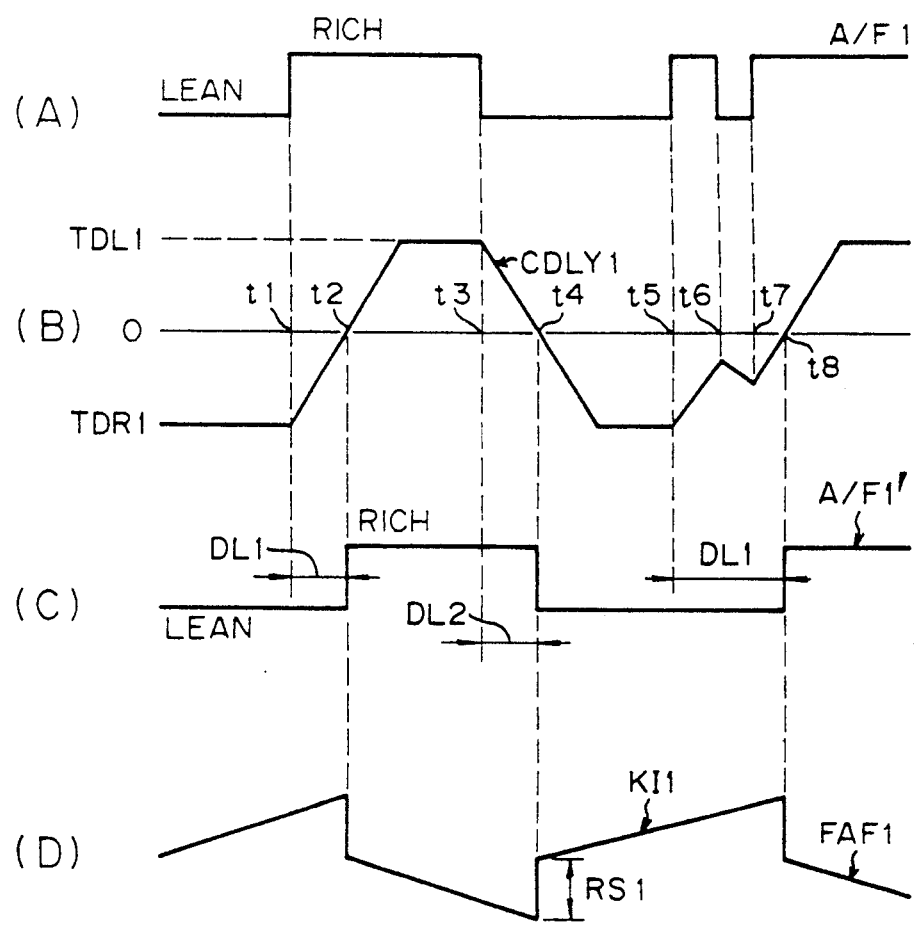
FIG. 5 is a view which illustrates waveforms for use to discriminate the state of the air/fuel ratio.

That is, assuming that the output from a first detection means shown in (B) of FIG. 4 is as shown in (A) of FIG. 5, delaying means acts as shown in (B) of FIG. 5 after time t3 shown in (B) of FIG. 5 if the air/fuel ratio has been changed from the rich state to the lean state at the time t3, so that the count of the delay counter CDLY1 is decreased one by one from its maximum value TDL1. The aforesaid operation is repeated during a period in which the lean state is maintained until the waveform of the delay counter CDLY1 reaches the minimum value TDR1 of the delay counter CDLY1 after it has been lowered to the right to traverse the reference level 0. As a result, a waveform obtained by inverting the waveform shown in (A) of FIG. 5 from the rich state to the lean state is transmitted at time t4 at which the waveform shown in (B) of FIG. 5 and indicating the value of the delay counter CDLY1 has traversed the reference level (0). That is, a waveform shown in (c) of FIG. 5 is formed which is obtained by delaying the waveform shown in (A) of FIG. 5 by a delay time (DL2) expressed by the difference between the times t3 and t4.

If the subject state is the rich state (V1>VR1), the count of the first delay counter CDLY1 is increased in step 107. In steps 108 and 109, the first delay counter CDLY1 is guarded with maximum value TDL1. The maximum value TDL1 is a lean delay time for maintaining a discrimination that the subject state is the rich state even if the output from the left air/fuel ratio sensor 21 has been changed from the rich state to the lean state, the maximum value TDL1 being defined by a positive value.

Referring to (A) to (C) of FIG. 5, the delayed means is operated after time t1 as shown in (B) of FIG. 5 in the case where the signal shown in (A) of FIG. 5 has been changed from the lean state to the rich state at time t1 so that the count of the delay counter CDLY1 is increased one by one starting from its minimum value TDR1, and this process is repeated during a period in which the waveform shown in (A) of FIG. 5 is in the rich state, the aforesaid process being continued until the waveform of the delay counter CDLY1 rises to the right, traverse the reference level (O), and reaches the maximum value TDL1 of the delay counter CDLY1.

As a result, a waveform obtained by inverting the waveform shown in (A) of FIG. 5 from the lean state to the rich state is transmitted at time t2 at which the waveform shown in (B) of FIG. 5 indicating the count of the delay counter CDLY1 has traversed the reference level. That is, a waveform is formed by delaying the waveform shown in (A) of FIG. 5 by a delay time DL1.

By processing that an operation of detecting the feedback state in response to an air/fuel ratio signal is, in the aforesaid process, delayed by a predetermined time period or until a predetermined condition is obtained by using the delay counter, if an air/fuel ratio signal A/F1 is inverted in a period shorter than the rich delay time (−TDR1) as taken place at times t5, t6 and t7 as shown in (A) of FIG. 5, the first delay counter CDLY1 takes a long time to traverse the reference value 0. As a result, an air/fuel ratio signal A/F1' to be transmitted after the delay process has been performed is inverted at time t8. That is, the air fuel ratio signal A/F1' to be transmitted after the delay process has been performed is further stabled in comparison to the air/fuel ratio signal A/F1 to be transmitted before the delay process is performed. As a result, an effect can be obtained in that the air/fuel ratio correction coefficient FAF1 shown in (D) of FIG. 5 can be obtained in accordance with the stabled air/fuel ratio signal A/F1' which has been subjected to the delay process.

It should be noted that the reference for the left delay counter CDLY1 is zero, and a discrimination is made that the air/fuel ratio after the delay process has been performed is the rich state if CDLY>0, and a discrimination is made that the air/fuel ratio after the delay process has been performed is the lean state if CDLY≦0.

In step 110, a discrimination is made as to whether or not the sign of the left delay counter CDLY1 has been inverted. That is, a discrimination is made as to whether or not the air/fuel ratio after the delay process has been performed has been inverted. If the air/fuel ratio has been inverted, a discrimination is made as to whether the inversion has been made from the rich state to the lean state or that has been made from the lean state to the rich state.

The aforesaid discrimination of the inverting direction can be made by a known method in which, for example, the inclination of the waveform shown in (B) of FIG. 5 is utilized. If a discrimination has been made that the delay air/fuel ratio has been invented from the rich state to the lean state, the flow proceeds to step 112 (that is, at time t4 shown in FIG. 4) in which skip correction coefficient RS1 having a predetermined value is added to the air/fuel ratio correction coefficient FAF1 which is correction coefficient is made to be FAF1 +RS1.

If a discrimination is made in step 111 that the inversion has been made from the lean state to the rich state, the air/fuel ratio correction coefficient is decreased in a skip manner as FAF1←(FAF1−RS1) in step 113. That is, a step process is performed.

If a discrimination is made in step 110 that the sign of the first delay counter CDLY1 has not been inverted, integration process is performed in steps 114, 115 and 116. That is, a discrimination is made in step 114 whether or not CDLY≦0. If CDLY≦0 (lean), the air/fuel ratio correction coefficient is processed in such a manner that FAF1 (FAF1+K11). If the air fuel ratio holds a relationship CDLY1>0 (rich), the air/fuel ratio correction coefficient is processed in such a manner that FAF1←(FAF1←K11).

The integration constant K11 is made to be a value which is sufficiently small with respect to the skip constant RS1. Step 115 is a step in which the fuel injection quantity is gradually enlarged in the lean state (CDLY≦0). Step 116 is a step in which the fuel injection quantity is gradually reduced in the rich state (CDLY>0).

The air/fuel ratio correction coefficient FAF1 calculated in steps 112, 113, 115 and 116 is guarded with a minimum value, for example, 0.8 and with a maximum value, for example, 1.2. As a result, problems of over-rich and over-lean are prevented by controlling the engine with the aforesaid values if the air/fuel ratio correction coefficient FAF1 has become a too large value or a too small value for some reason or other.

The FAF1 thus calculated is stored in the RAM, and this routine is completed here. Therefore, the air/fuel ratio correction coefficient FAF forms a wave as shown in (D) of FIG. 5. If setting as rich delay time (−TDR1)>lean delay time (TDL1) is made, the air/fuel ratio to be controlled can be translated to the rich values. On the contrary, the air/fuel ratio to be controlled can be translated to the lean values by making lean delay time (TDL1)>rich delay time (−TDR1).

That is, the air/fuel ratio can be controlled by correcting the delay times TDR1 and TDL1 in accordance with the output from the sub air/fuel ratio sensor 25. Therefore, the present invention is arranged in such a manner that the delay time to be realized in the air/fuel ratio feedback control by using the aforesaid left air/fuel ratio sensor 21 is adjusted in accordance with output from the sub air/fuel ratio sensor 25. Specifically, the reference level (O) shown in (B) of FIG. 5 is changed by utilizing the output from the sub air/fuel ratio sensor 25.

Then, description will now be made about an operation of adjusting the delay time to be performed in a routine for processing the output from the left air/fuel ratio sensor 21 by means of the sub air/fuel ratio sensor 25.

Figure 6:
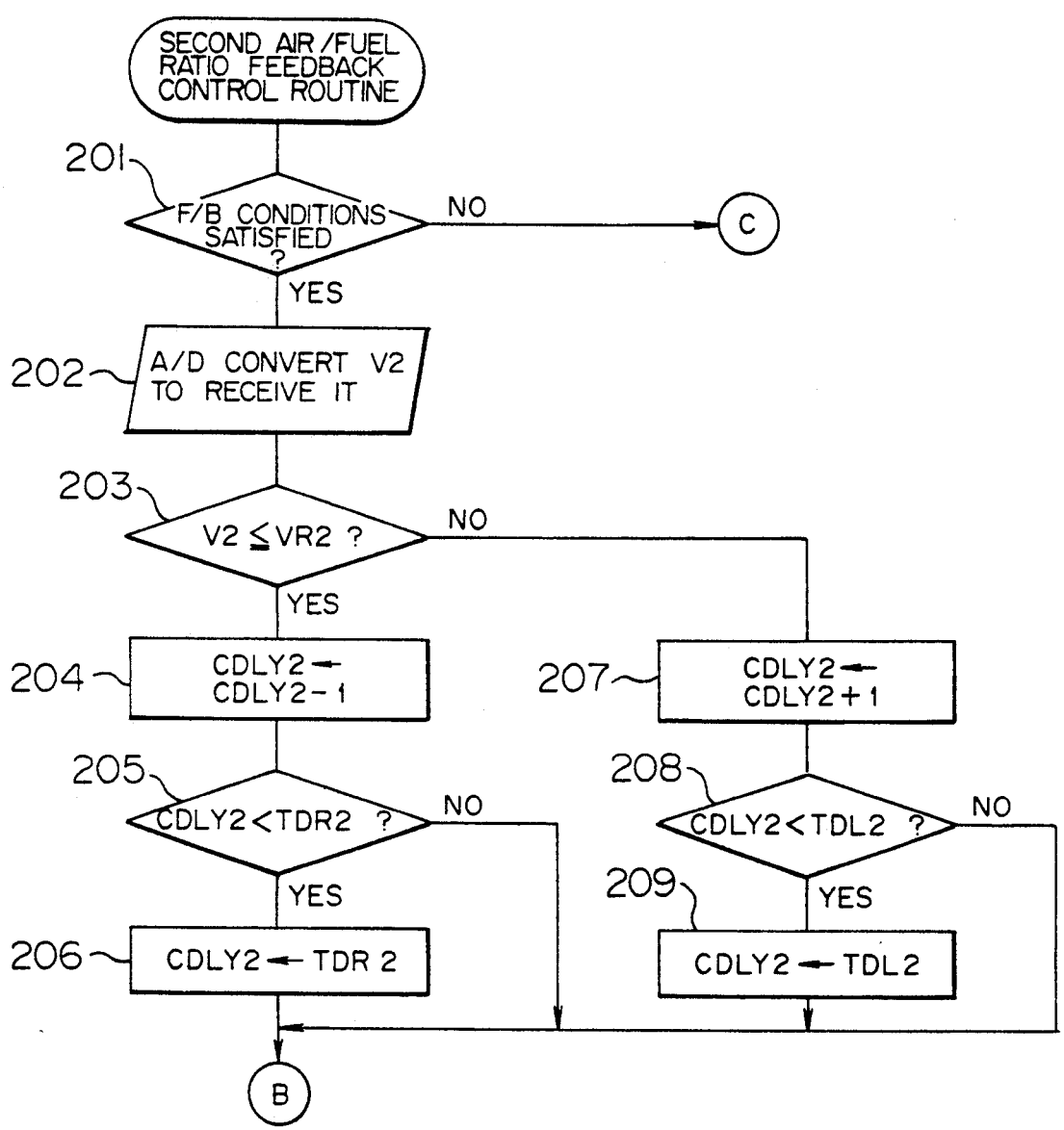
FIG. 6 is a flow chart which illustrates a front half portion of a second air/fuel ratio feedback control routine to be executed in the control device.
Figure 7:
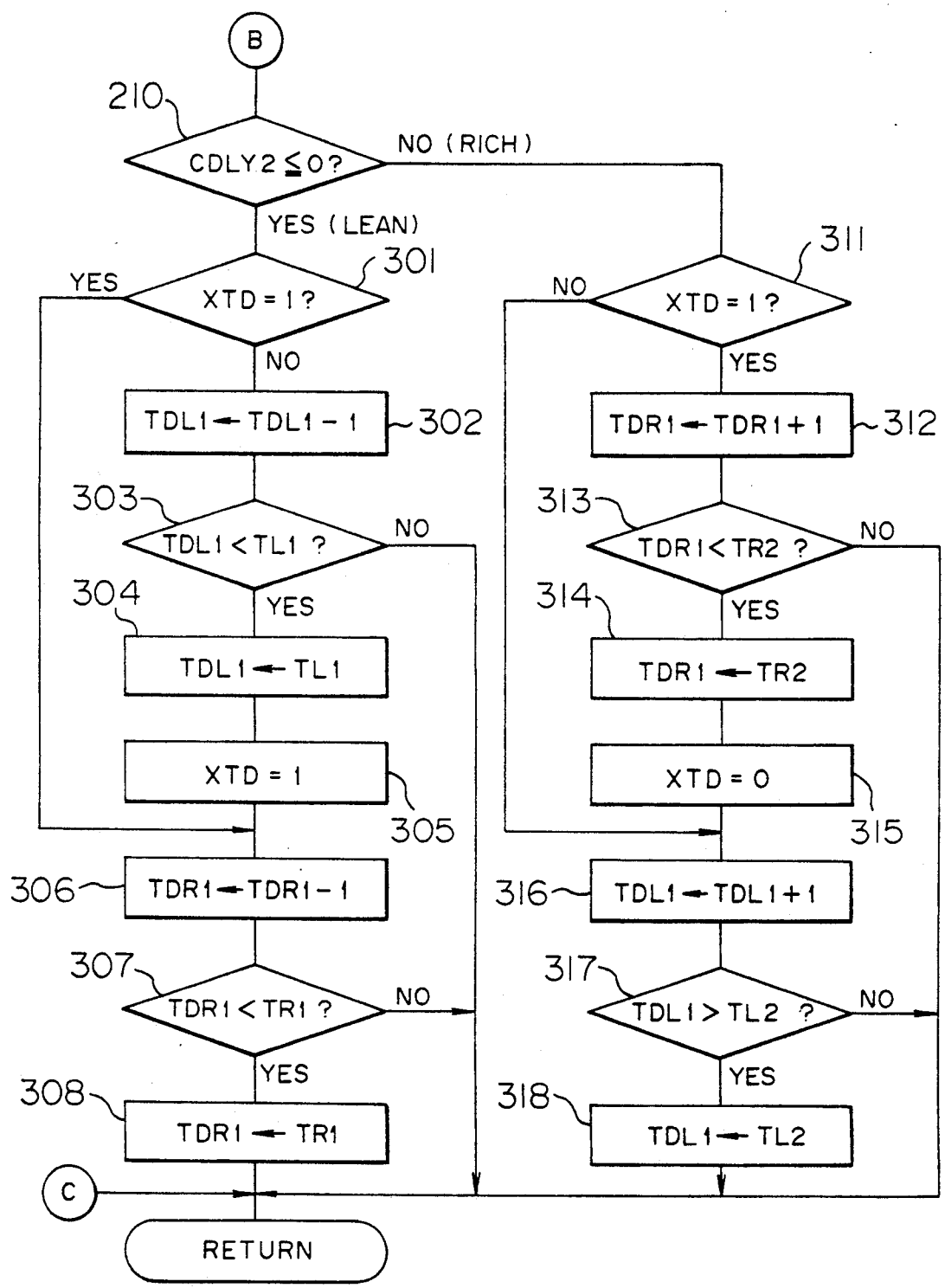
FIG. 7 is a flow chart which illustrates an rear half portion of the second air/fuel ratio feedback control routine to be executed in the control device.

FIGS. 6 and 7 illustrate a flow chart of a calculation process for obtaining the delay times TDR1 and TDL1 by the sub air/fuel ratio sensor 25. That is, the aforesaid routine is a second air/fuel ratio feedback control routine for calculating the delay times TDR1 and TDL1 in accordance with the output from the sub air/fuel ratio sensor 25, the second air/fuel ratio feedback control routine being executed every predetermined time Is. In step 201, a discrimination is made as to whether or not the air/fuel ratio feedback conditions are met. Since meeting of the air/fuel ratio feedback conditions has been described in step 101 shown in FIG. 3, it is omitted from the description.

If the feedback conditions are not met, this routine is completed while omitting the following process. If the feedback conditions are met, the flow proceeds to step 202 in which value v2 of the output from the sub air/fuel ratio sensor 25 is A/D-converted before the value V2 is received. Steps 202 to 309 correspond to steps 102 to 109 shown in FIG. 3. That is, the result of the discrimination of the air/fuel ratio made in step 203 is subjected to a delay process in steps 204 to 209. The air/fuel discrimination which has been delayed, is made in step 210.

In step 210, a discrimination is made as to whether or not $CDLY2 \leq 0$. If a discrimination is made that $CDLY2 \leq 0$, a discrimination is made that the air/fuel ratio in the lower stream from the catalyst is lean, and the flow proceeds to steps 301 to 308. If $CDLY2 > 2$, a discrimination is made that the air/fuel ratio in the lower stream from the catalyst is rich, and the flow proceeds to steps 311 to 318.

If a discrimination is made that the aforesaid air/fuel ratio is lean, the value of flag XTD indicating that either the rich delay time (−TDR1) or the lean delay time (TDL1) of the left air/fuel ratio sensor 21 must be varied is discriminated in step 301. If XTD=1 in step 301, TDR1 is changed. If XTD=0, the TDL1 is changed.

If the air/fuel ratio is lean and if XTD=0 (T2 shown in FIG. 8), the flow proceeds to step 302 in which a process of TDL1←TDL1−1 is performed, so that the upper limit value of the delay counter CDLY1 shown in FIG. 5 is lowered. That is, the lean delay time TDL1 shown in FIG. 4 is shortened, and the speed at which the left air/fuel ratio sensor 21 is changed from rich to lean is raised so as to translate the air/fuel ratio toward the rich ratio. In steps 303 and 304, TDL1 is guarded with the minimum value TL1. Since TL1 is a positive value as described above, TL1 means the shortest delay time. The flow then proceeds to step 305 in which the flag XTD is set to 1.

If a discrimination is made in step 301 that XTD=1 (T3 shown in FIG. 8), the flow proceeds to step 306 in which lower limit value TDR1 of the delay counter CDLY1 is decreased in such a manner that TDR1←TDR1−1, causing the speed at which the left air/fuel ratio sensor 21 is changed from lean to rich is lowered. As a result, the air/fuel ratio is translated toward rich values. In steps 307 and 308, TDR1 is guarded with minimum value TR1. Since TR1 is a negative value, the term (−TR1) means the maximum rich delay time.

Figure 9:
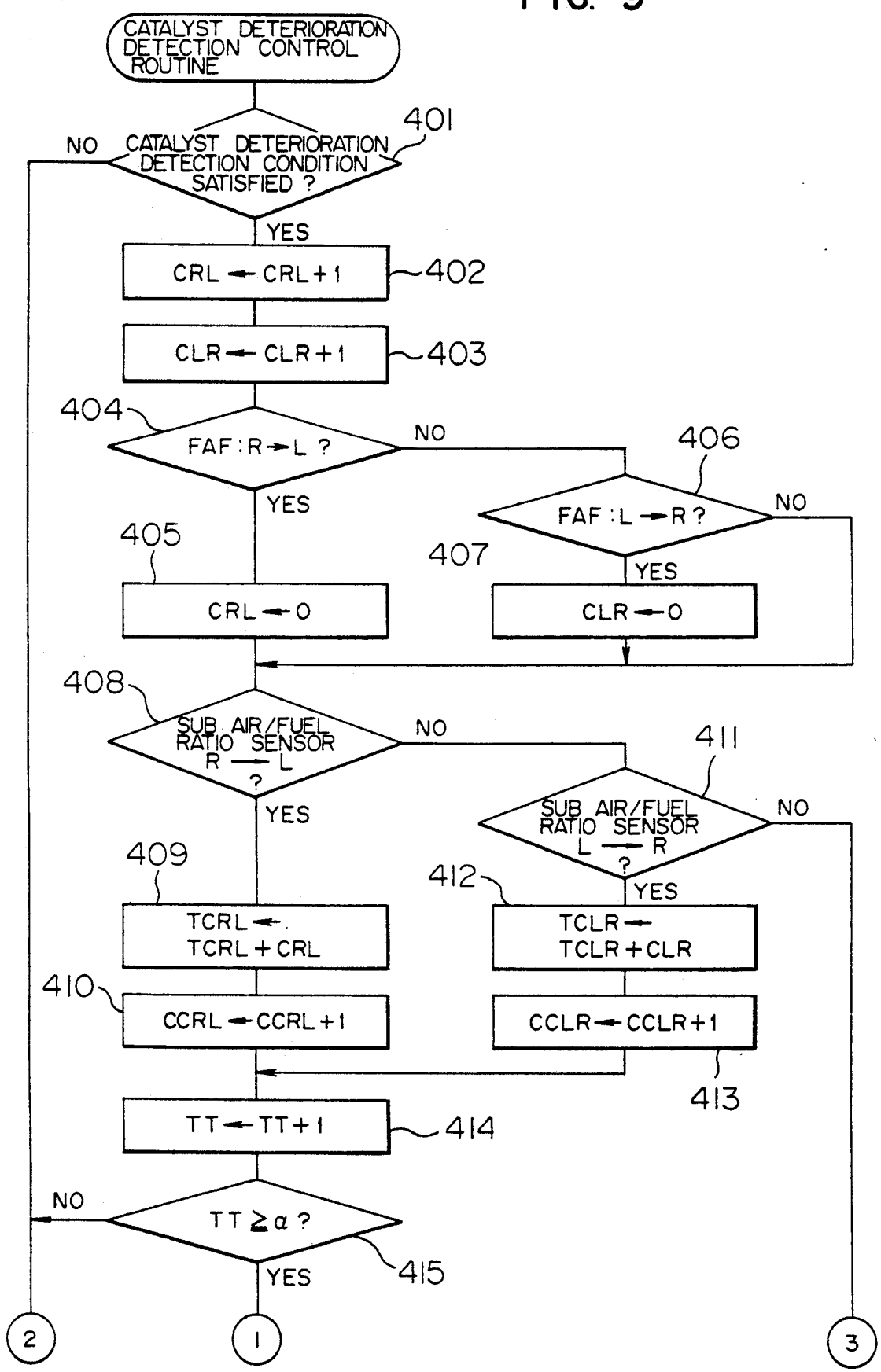
FIG. 9 is a flow chart which illustrates a front half portion of a catalyst deterioration detection control routine to be executed in the control device.

In the period at T2 and T3 shown in FIG. 9 in which the sub air/fuel ratio sensor 25 is on the lean side, also the signal transmitted from the left air/fuel ratio sensor 21 is translated toward the lean value.

If a discrimination is made in step 210 that the output from the sub air/fuel ratio sensor 25 is rich, the value of the flag XTD is discriminated in step 311. In the case where XTD=1 (T4 shown in FIG. 9), the flow proceeds to step 312, so that the rich delay time is processed in such a manner that TDR1←TDR1+1. That is, the rich delay time (−TDR1) is shortened, and the speed at which lean is changed to rich is raised, so that the air/fuel ratio is translated toward the lean value. In ensuing steps 313 and 314, TDR1 is guarded with the maximum value TR2. Since TR2 also is a negative value, the term (−TR2) means the shortest rich delay time. Then, the flow proceeds to step 315 in which the flag XTD is set to 0.

If a discrimination is made in step 311 that the flag XTD has been set to 0 (T1 and T5 shown in FIG. 8), the flow proceeds to step 316 in which the lean delay time TDL1 is elongated and the speed at which the left air/fuel ratio sensor 21 is changed from rich to lean is delayed, so that the air/fuel ratio is translated toward the lean values. In steps 317 and 318, TDL1 is guarded with the maximum value TL2. Since TL2 is a positive value, TL2 means the longest lean delay time.

As described above, also the signal transmitted from the left air/fuel ratio sensor is translated toward the rich values in the periods T1, T4 and T5 in which the sub air/fuel ratio sensor 25 is rich.

In accordance with the period of the signal transmitted from the left air/fuel ratio sensor 21, the Z characteristics of which have been modified as described above, deterioration of the left air/fuel ratio sensor 21 is discriminated. Therefore, the state of deterioration can be detected because the deviation of the Z characteristics is reflected to the feedback control period.

Then, TDR1 and TDL1 thus calculated are stored in the RAM, and this routine is completed.

Assuming that the output V2 from the sub air/fuel ratio sensor 25 in the aforesaid routine is shown by the waveform shown in (E) of FIG. 4, the output V2 is subjected to a comparison with the reference voltage VR2. As a result, a waveform in which rich states and lean states are present as shown in (F) of FIG. 4 is formed similarly to the aforesaid left air/fuel ratio sensor 21. In accordance with the waveform, the delay time TDR1 and TDL1 are calculated in accordance with steps subsequent to the step 210 shown in FIG. 7, so that the delay time is adjusted to an adequate time by means of the aforesaid delay time adjustment means.

Figure 8:
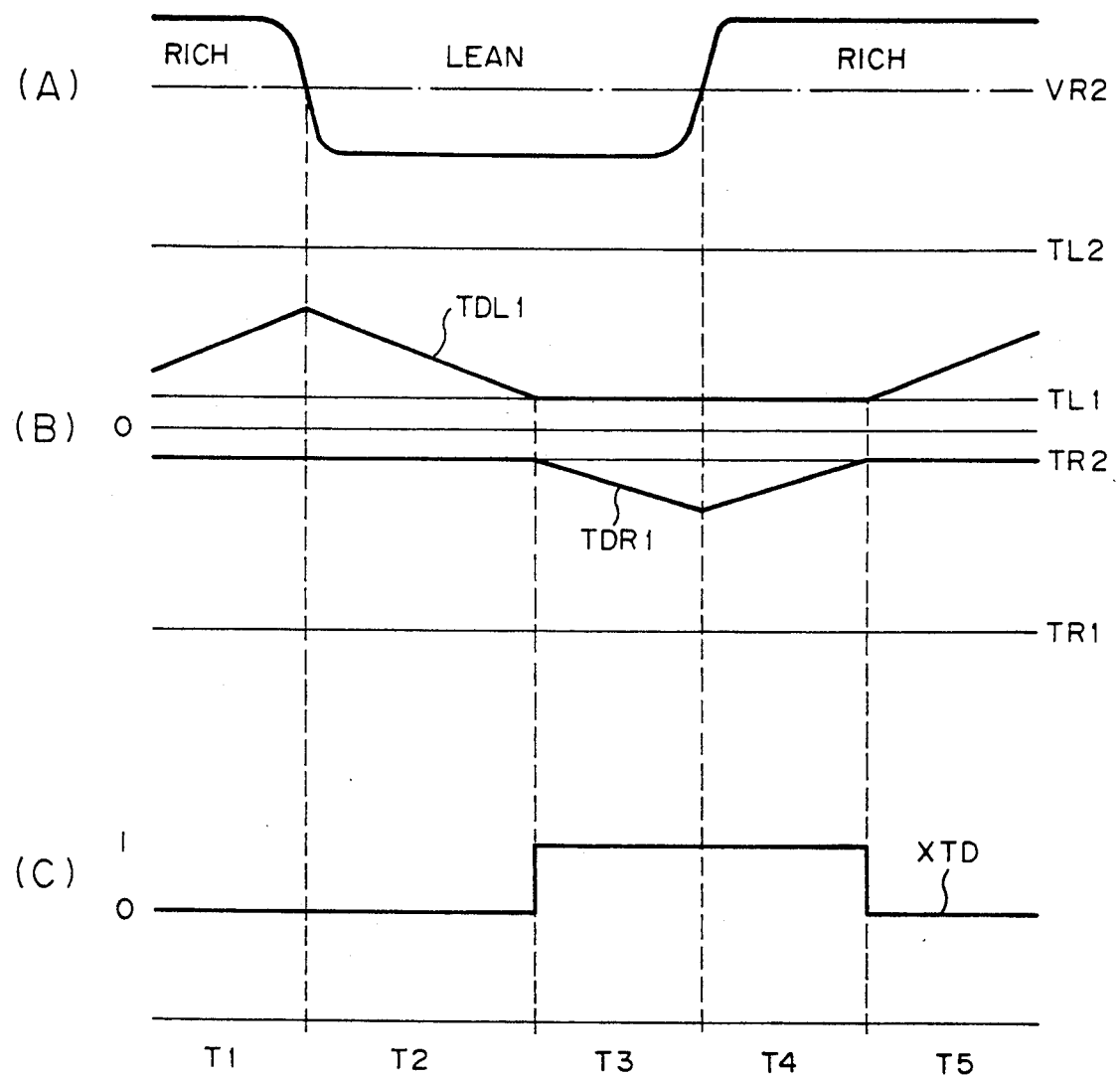
FIG. 8 is a timing chart for delay times TDR1 and TDL1 in the second air/fuel ratio feedback control routine.

FIG. 8 is a timing chart for the delay times TDR1 and TDL1 in the aforesaid flow chart. When the output voltage V2 from the sub air/fuel ratio sensor 25 has been changed as shown in (A) of FIG. 8, both of the delay times TDR1 and TDL1 are shortened as shown in (B) of FIG. 8 if the air/fuel ratio is the lean state (V2 ≤VR2). If it is rich state, both of the delay times TDR1 and TDL1 are elongated. The rich delay time TDR1 is changed in a range from TR1 to TR2 at this time, so that the lean delay time TDL1 is changed in a range from TL1 to TL2.

Although the feedback control of the air/fuel ratio of the left bank SBH has been described, the feedback control of the air/fuel ratio of the right bank SBM can be executed by performing a similar process in accordance with a detection signal supplied from the right air/fuel ratio sensor 23 and the sub air/fuel ratio sensor 25.

Figure 10:
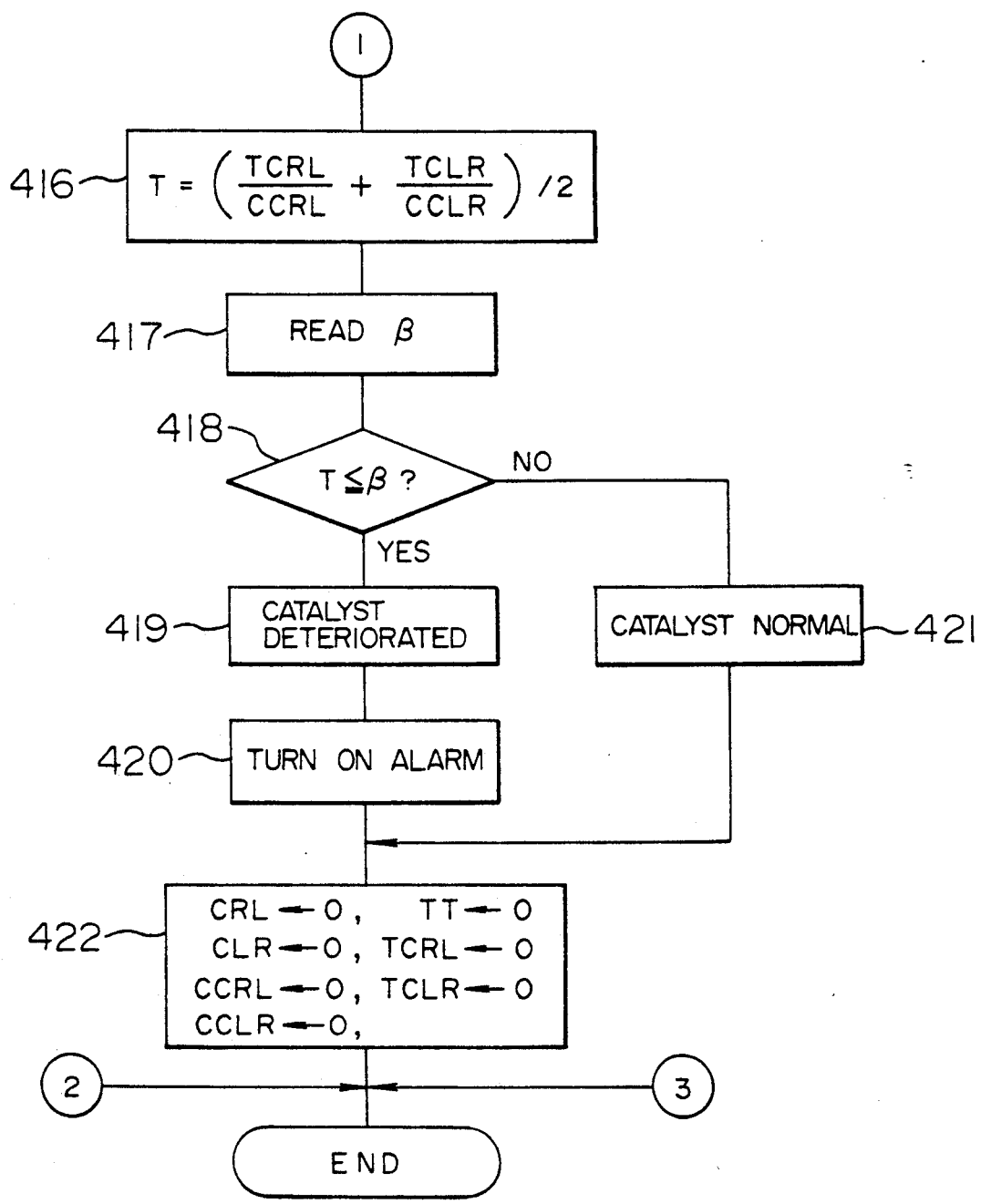
FIG. 10 is a flow chart which illustrates a rear half portion of a catalyst deterioration detection control routine to be executed in the control device.

Then, the operation to be performed when the deterioration of the catalyst is detected will now be described. FIGS. 9 and 10 illustrate a catalyst deterioration detection control routine for detecting deterioration of a ternary catalyst 17. The aforesaid routine is started so as to be executed at predetermined intervals (for example, 64 msec in this embodiment). In step 401, whether or not deterioration detection conditions are satisfied as discriminated, that is, whether or not the deterioration detection process is executed is discriminated. The deterioration detection conditions according to this embodiment are, for example, that the aforesaid main and sub air/fuel ratio feedback control is being performed, the air/fuel ratio correction coefficient FAF, the first rich skip quantity RSR1 and the first lean skip quantity RSL1 are not the guarded values, and the engine 1 is in a normal state, and the like. If the deterioration detection conditions are not satisfied in step 401, the following processes are not performed and this routine is completed here.

If the catalyst deterioration detection conditions are satisfied in step 401, deterioration detection processes are performed starting from step 402. In steps 402 and 403, counts of the counters CRL and CLR are first increased (CRL←CRL+1, CLR←CLR+1).

The count of the counter CRL corresponds to an elapsed time from a moment the air/fuel ratio correction coefficient FAF has been changed from rich to lean in a skip manner, while the count of the counter CLR corresponds to an elapsed time from a moment the air/fuel ratio correction coefficient FAF has been changed from lean to rich in a skip manner.

Figure 11:
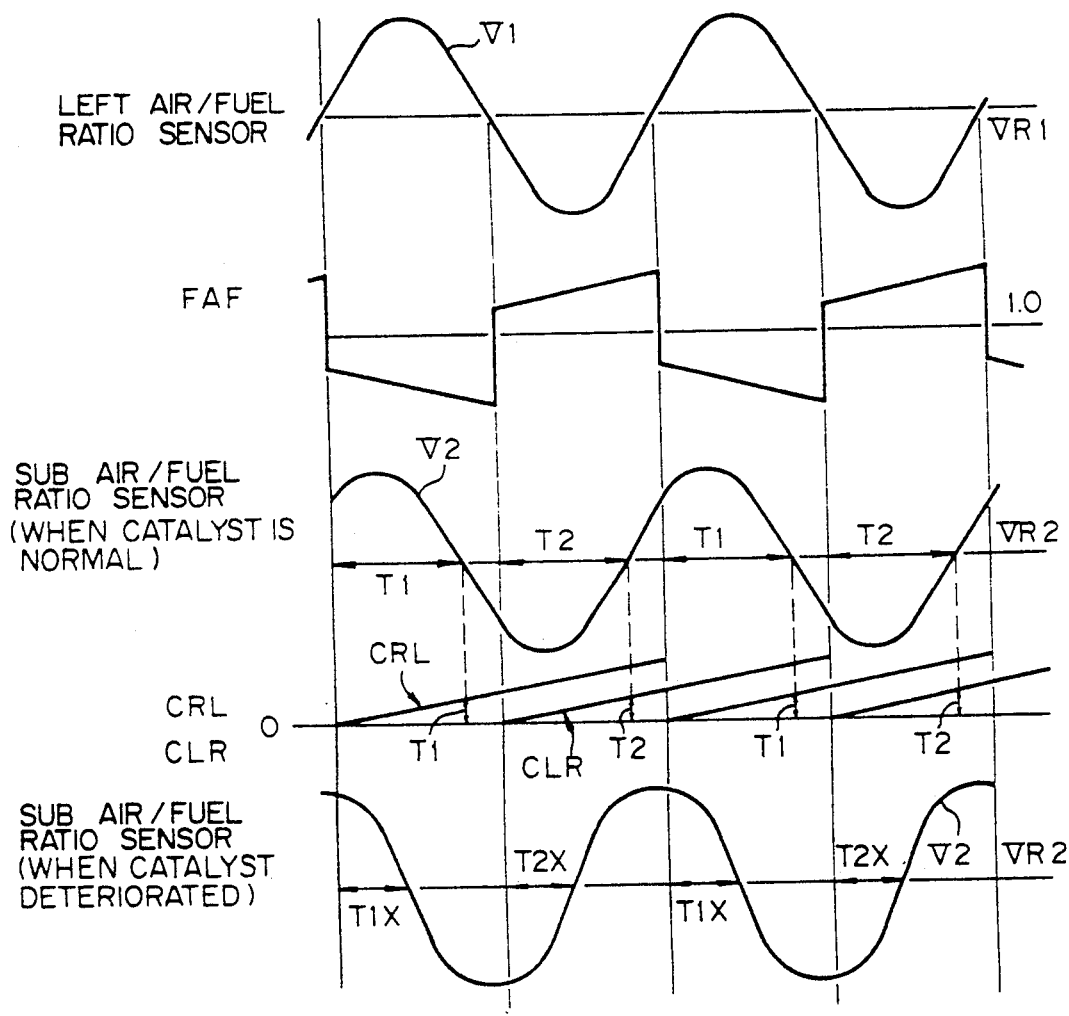
FIG. 11 illustrates waveforms of outputs from a left air/fuel ratio sensor, an air/fuel ratio correction coefficient FAF and a sub air/fuel ratio sensor.

FIG. 11 illustrates the waveforms of the outputs from the left air/fuel ratio sensor 21, the air/fuel ratio correction coefficient FAF and the sub air/fuel ratio sensor 25. The output from the sub air/fuel ratio sensor 25 traverses the comparative voltage TR2 toward the lean value or toward the rich values after corresponding predetermined times T1 and T2 have passed when the air/fuel ratio correction coefficient FAF has been changed in a skip manner (from rich to lean and from lean to rich).

That is, if the catalyst 17 is normal, the propagation of the change of the air/fuel ratio taken place due to the change of the air/fuel ratio correction coefficient FAF to the sub air/fuel ratio sensor 25 is delayed due to the storage effect of the catalyst 17. If the catalyst 17 has deteriorated, also its storage effect deteriorates, so that delay times T1X and T2X of the change of the output from the sub air/fuel ratio sensor 25 due to the change of the air/fuel ratio correction coefficient FAF are respectively shortened with respect to normal delay time T1 and T2 as shown in FIG. 11.

In this embodiment, the delay time T1 from a moment the air/fuel ratio correction coefficient FAF is changed from rich to lean to a moment the output voltage V2 from the sub air/fuel ratio sensor 25 become lower than the comparative voltage VR2 is counted by the counter CRL. On the other hand, the delay time T2 from a memory the air/fuel ratio correction coefficient FAF is changed from lean to rich to a moment the output voltage V2 is raised to a level higher than the comparative voltage VR2 is counted by the counter CLR. Furthermore, T1 and T2 are obtained by a predetermined number of times a (for example, 10 times), the average of T1 and T2 is calculated, and the deterioration of the catalyst 17 is discriminated in accordance with the average value.

Referring back to FIG. 9, the counts of the counters CRL and CLR are increased in steps 402 and 403. In step 404, a discrimination is made as to whether or not the air/fuel ratio correction coefficient FAF has been changed from rich to lean in a skip manner, that is, whether or not the value of FAF has been lowered from 1.0 or more to 1.0 or less is discriminated. If it has been changed from rich to lean, the counter CRL is reset in step 405 (CRL←0).

In next step 408, a discrimination is made as to whether or not the sub air/fuel ratio sensor 25 has been changed from rich to lean, that is, whether or not the output voltage v2 has been lowered to a level lower than the comparative voltage VR2, is discriminated. If it has been lowered than the comparative voltage VR2, the present count value CRL (a value corresponding to T1) is, in step 409, added to the count of the integrating counter TCRL, which corresponds to the integrated value of the delay time T1 and which is first integrating means (TCRL←TCRL+CRL).

In step 410, an integration time counter CCRL which counts the number of integrations of the counter value CRL is increased (CCRL←CCRL+1). In next step 414, the count of an execution integration counter TT corresponding to the number of integrations of the delay times T1 and T2 is increased (TT←TT+1). In step 415, a discrimination is made as to whether or not the integrating counter TT has reached a predetermined number of times α (whether or not integration has been Performed for a predetermined period) If an affirmative discrimination has been made, processes in steps 416 to 421 are performed. If a negative discrimination is made, this routine is completed.

If a negative discrimination is made in step 404, a discrimination is made in step 406 as to whether or not the air/fuel ratio correction coefficient FAF has been changed from lean to rich in a skip manner, that is, whether or not the value of FAF has been raised from 1.0 or less to 1.0 or more. If it has been changed from lean to rich, the counter CLR is reset in step 407 (CLR ←0).

If a negative discrimination is made in step 408, a discrimination is made in step 411 as to whether or not the sub air/fuel ratio sensor 25 has been changed from lean to rich, that is, whether or not the output voltage V2 has exceeded the comparative voltage VR2, is discriminated. It has exceeded the comparative voltage VR2, the present count value CRL (corresponding to T2) is, in step 412, added to the TCLR which integrates the delay time T2 (TCLR←TCLR+CLR).

In step 413, the integration time counter CLRL which counts the number of integrations of the counter value CRL is increased (CCLR←CCLR+1).

If a negative discrimination has been made in step 406, that is, if the air/fuel ratio correction coefficient FAF is not being changed from rich to lean or from lean to rich, the counters CRL and CLR are not reset, and the flow proceeds to step 408. If a negative discrimination is made in both steps 408 and 411, the following process is not performed. That is, only updating the counters CRL and CLR is performed if the FAF is not being changed from rich to lean and the sub air/fuel ratio sensor 25 is not being changed from rich to lean in this routine.

If the integrating counter TT has, in step 415, reached the predetermined number of time α, the flow proceeds to step 416 in which average value T of the delay times T1 and T2 is calculated in accordance with Equation (1).

$$T = (TCRL/CCRL + TCLR/CCLR)/2 \quad (1)$$

where TCRL/CCRL is a result of subtraction obtained by subtracting the integration result TCRL by number of integrations CCRL and corresponds to the average value of the delay time T1 in CCRL times. TCLR/CCLR is a result of subtraction obtained by subtracting the integration result TCRL by the number of integrations CCRL and corresponds to the average of the delay time T2 in CCRL times. Therefore, T obtained by subtracting the sum of them is the average delay time including T1 and T2.

Figure 12:
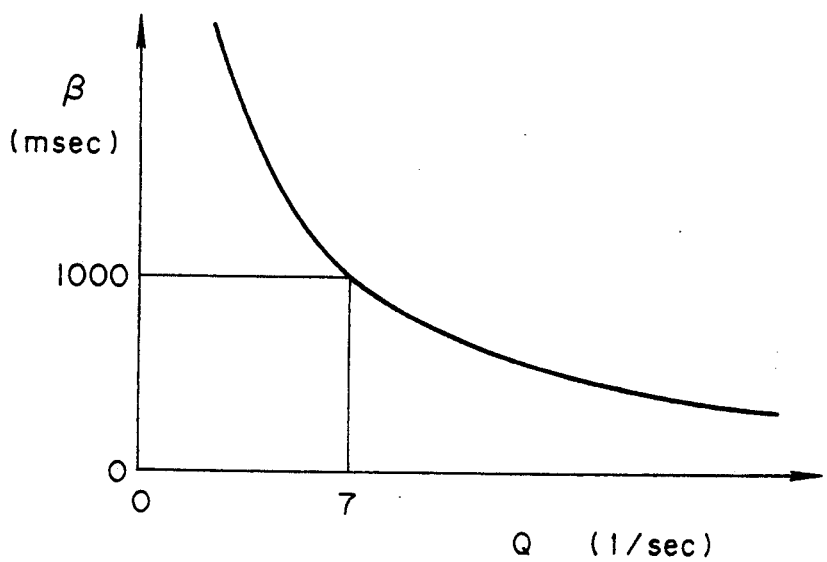
FIG. 12 is a graph which illustrates a deterioration discrimination level determined to correspond to the quantity of sucked air.

In step 417, deterioration discrimination level $\beta$ is read. The deterioration discrimination level $\beta$ is determined to correspond to sucked air quantity Q as shown in FIG. 12. The deterioration discrimination level $\beta$ is lowered in inverse proportion to the sucked quantity Q. When the deterioration level $\beta$ has been determined in step 417, the average value T and the deterioration discrimination level $\beta$ are subjected to a comparison in step 418. If the average value T is smaller than the deterioration discrimination level $\beta$, a discrimination is made in step 419 that the catalyst 17 has deteriorated. Then, an alarm 19 is turned on in step 420, and the flow proceeds to step 422.

If the average value T is larger than the deterioration discrimination level $\beta$, a discrimination is made in step 421 that the catalyst 17 is normal, and the flow proceeds to step 422. In step 422, the counters CRL, CLR, the integrating counters TCRL, TCLR, the integration time counters CCRL and CCLR and the execution integrating counter TT are reset, and this routine is completed here.

Although the aforesaid embodiment is arranged in such a manner that the delay times T1 and T2 are obtained by a predetermined number of times and the deterioration of the catalyst 17 is detected by using their average value T, the deterioration of the catalyst 17 may be discriminated by subjecting only the average value (TCRL/CCRL) of the delay time T1 or only the average value (TCLR/CCLR) of the delay time T2 is subjected to a comparison with the deterioration discrimination level $\beta$.

As an alternative to using the result of the subtraction obtained by integrating the delay times T1 and T2 and by subtracting the integration result by the number of integrations, that is, as an alternative to using the average value, the delay time T1 or T2 for only one time is subjected to a comparison with the deterioration discrimination level $\beta$ to discriminate the deterioration of the catalyst 17.

As an alternative to executing the deterioration discrimination process from step 416 after the number of integrations of the delay times T1 and T2 has exceeded the predetermined number of times $\alpha$, the deterioration discrimination process from step 416 may be executed at predetermined intervals (for example, at intervals of 640 msec.).

As an alternative to setting the deterioration discrimination level $\beta$ to correspond to the sucked air quantity Q, it may be set to a predetermined constant value, for example, 1 sec.

The discrimination of the deterioration is not limited to the method according to this embodiment in which it is discriminated in accordance with the delay times T1 and T2. Any one of the conventional methods may be employed which are exemplified by a method which uses the frequency ratio (refer to Japanese Utility Model Laid-Open No. 63-128221), a method which employs the amplitude ratio (refer to U.S. Pat. No. 3,962,866), and a method which employs the area ratio (refer to SAE910561).

Then, an influence eliminating control process which is the characteristic of the present invention will now be described. In this embodiment, an influence of an exhaust gas from either of the banks (the right bank SBM according to this embodiment) is minimized and the deterioration of the catalyst is discriminated in accordance with information obtained from the residual bank (the left bank SBH according to this embodiment). Therefore, the deterioration discrimination is, as described above, executed by using the air/fuel ratio correction coefficient FAF for the left bank SBH and the signal supplied from the sub air/fuel ratio sensor 25.

Then, the methods of eliminating the influence of the exhaust gas emitted from the right bank SBM will now be described with reference to three embodiments.

Figure 13:
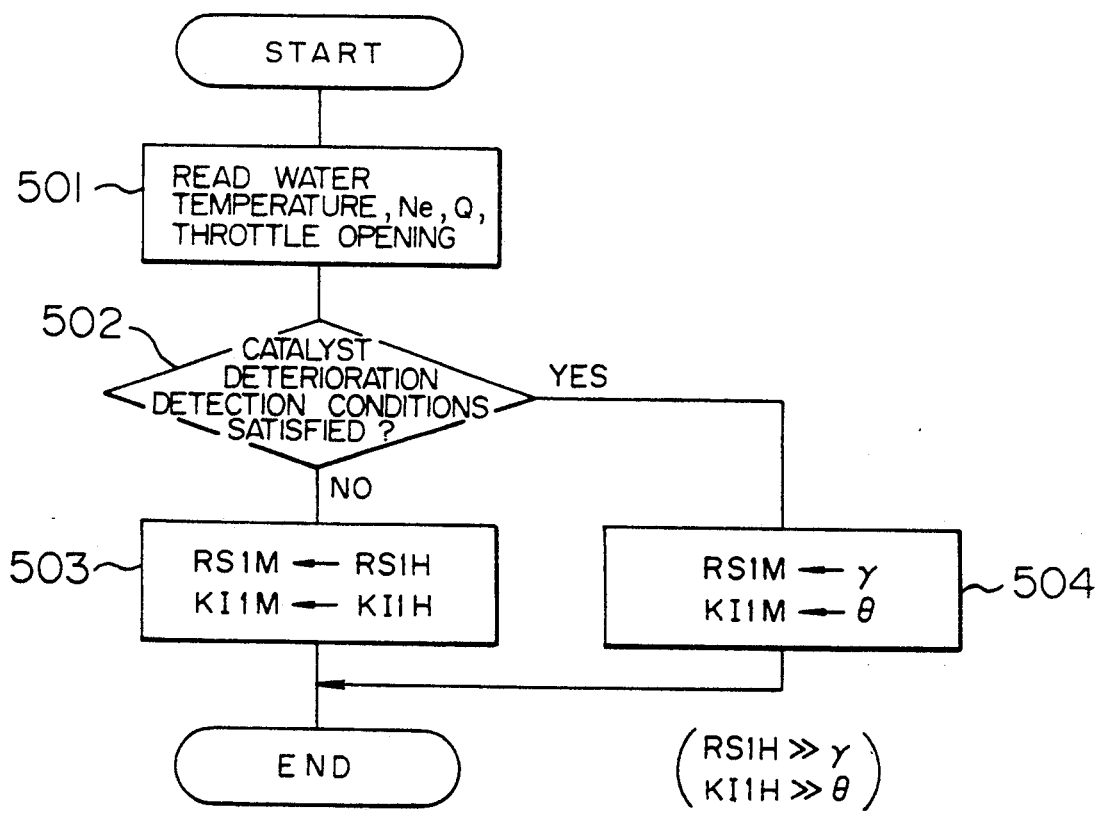
FIG. 13 is a flow chart which illustrates a first embodiment of an influence eliminating control process.

A first embodiment will now be described with reference to a flow chart shown in FIG. 13. First, a variety of parameters such as the temperature of water in the engine 1, the engine speed Ne, the sucked air quantity Q and the degree of opening of the throttle are read in step 501. In step 502, a discrimination is made as to whether or not the catalyst deterioration detection conditions have been satisfied. The catalyst deterioration detection conditions are exemplified by a fact that the engine 1 is normal, or a fact that a discrimination has been made once.

If the catalyst deterioration detection conditions are not satisfied in step 502, the feedback constants for the two banks SBH and SBM are, in step 503, made to be the same. That is, left skip constant RS1H and integrating constant KI1H are substituted into the right skip constant RS1M and the integrating constant KI1M.

If the catalyst deterioration detection conditions are satisfied in step 502, the feedback constant for the right bank SBM is reduced in step 504. Specifically, a small value $\gamma$ (RS1M > $\gamma$) is substituted into right skip constant RS1M, while a small value $\theta$ (KI1M > $\theta$) is substituted into the integrating constant KI1M. After step 503 or step 504 has been completed, this routine is completed temporarily.

Figure 18:
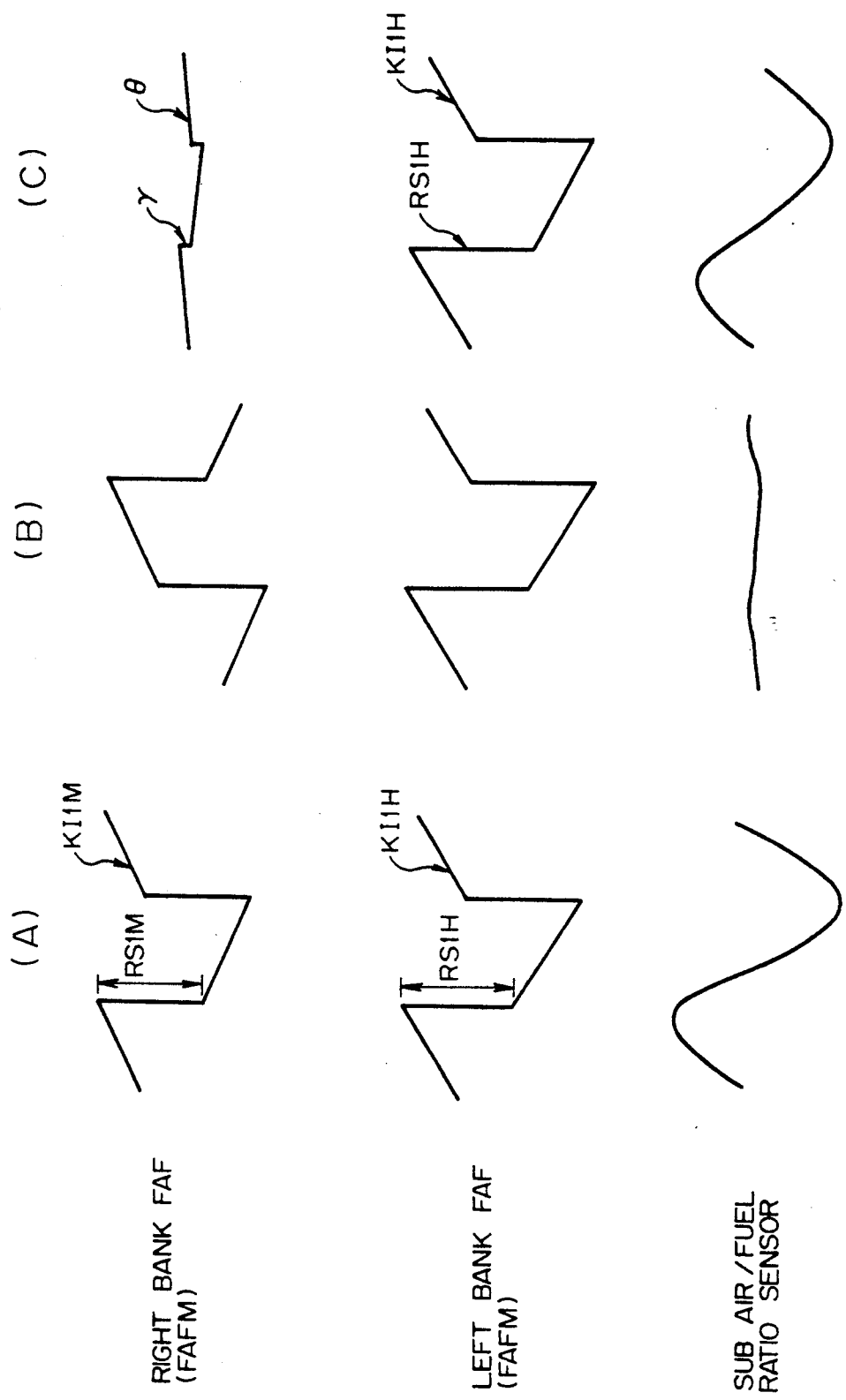
FIG. 18 is a waveform view which illustrates the change of waveforms of the air/fuel ratio correction coefficient FAF in the first embodiment of the influence eliminating control process.

FIG. 18 illustrates changes of the waveforms of the air/fuel ratio correction coefficient FAF realized in the case where the aforesaid process has been executed. In the case where the catalyst deterioration detection conditions are not satisfied, the two banks SBH and SBM have the same feedback constant, and the skip constant RS1M and the air/fuel ratio correction coefficient FAF have the same integrating constant KI1M which is the inclination of the skip constant RS1M and the air/fuel ratio correction coefficient FAF. However, the phase of the waveform of the left bank FAF (FAFH) and that of the right bank FAF (FAFM) do not always coincide with each other because the two banks SBH and SBM are independently feedback-controlled.

In the case where, for example, the phase of the right FAF and that of the left FAF coincide with each other, the same type gas are mixed with each other in such a manner that, if either of them is rich gas also the residual FAF is rich gas, and if either of them is lean gas also the residual FAF is lean gas, as shown in (B) of FIG. 18. As a result, the waveform can be measured by the sub air/fuel ratio sensor 25. If the phase of the right FAF and the phase of the left FAF become inverted, the rich gas and the lean gas are mixed to each other as shown in (B) of FIG. 18, resulting in a gas having an air/fuel ratio of $\lambda=1$ to be generated. As a result, the waveform to be detected by the sub air/fuel ratio sensor 25 cannot realize amplification.

In the case where the catalyst deterioration detection conditions are satisfied, the air/fuel ratio feedback constant for the right bank SBM is decreased. Therefore, both the squip quantity ($\gamma$) and the inclination ($\theta$) of the waveform are reduced as shown in (c) of FIG. 18, resulting in the amplitude of FAF to be reduced considerably. Therefore, the influence of the exhaust gas from the right bank SBM is considerably reduced, and the waveform detected by the sub air/fuel ratio sensor 25 assuredly shows the change of the air/fuel ratio with respect to the left bank SBH. In accordance with the aforesaid signal, the catalyst deterioration discrimination can assuredly be performed.

Figure 14:
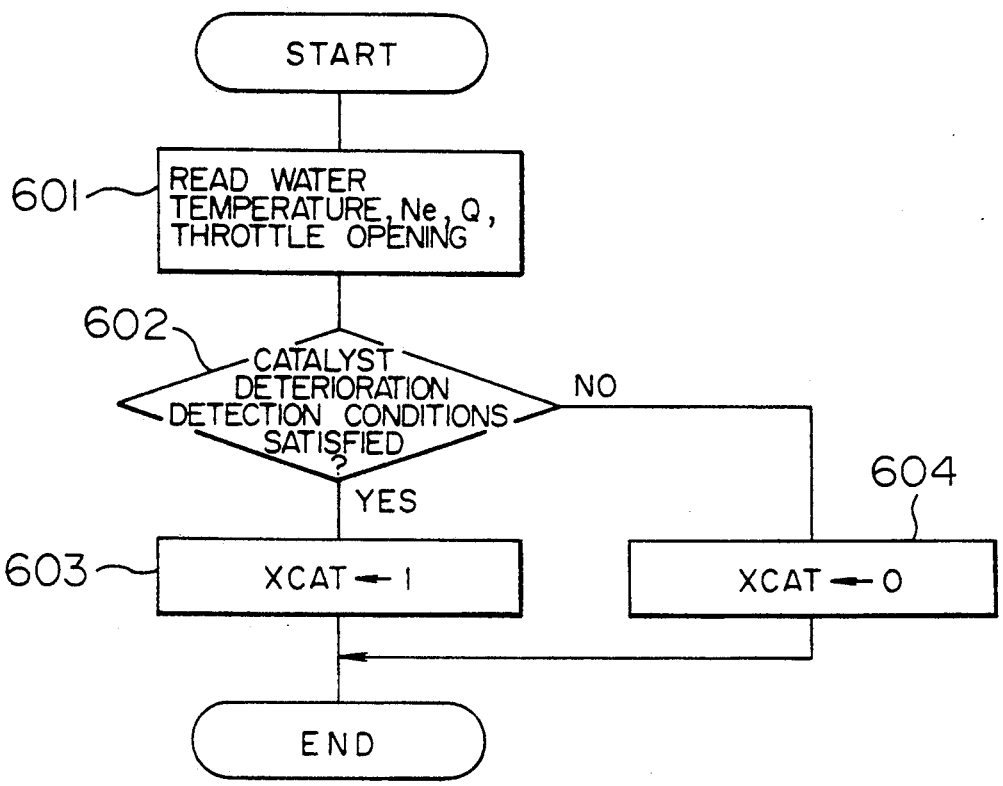
FIG. 14 is a flow chart which illustrates a routine for discriminating a catalyst deterioration detection condition to be performed by a second embodiment of the influence eliminating control process.
Figure 15:
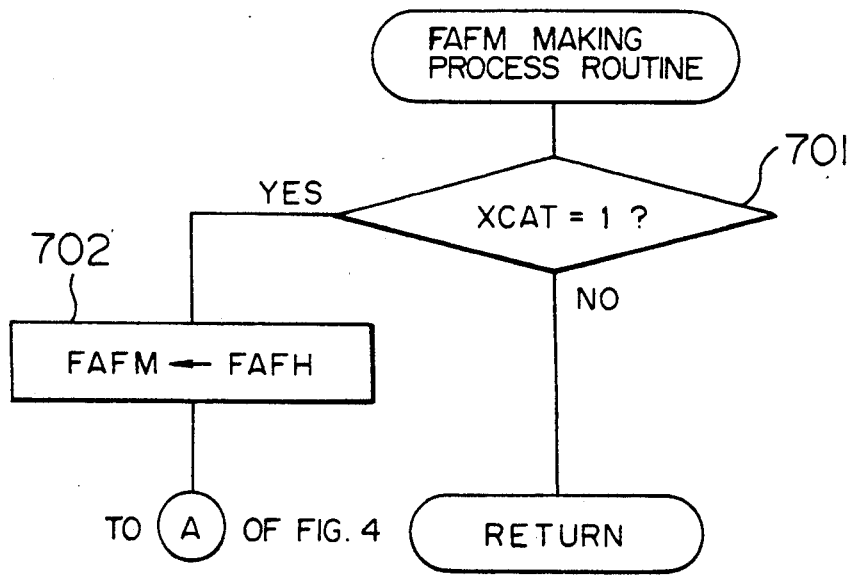
FIG. 15 is a flow chart which illustrates a FAFM making process to be performed by the second embodiment of the influence eliminating control process.

Then, a second embodiment will now be described with reference to a flow chart shown in FIGS. 14 and 15.

The second embodiment is arranged to eliminate the influence of the exhaust gas from the right bank SBM by arranging the structure in such a manner that the air/fuel ratio correction coefficient FAF (hereinafter also called a left bank correction coefficient FAFH) of the left bank SBH is also used as the air/fuel ratio correction coefficient FAF (hereinafter also called a right bank correction coefficient FAFH) of the right bank SBM so as to make the control phases of them coincide with each other. First, a variety of parameters such as the temperature of water in the engine 1, the engine speed Ne, the sucked air quantity Q and the degree of opening of the throttle are read in step 601 shown in FIG. 14. In step 602, a discrimination is made as to whether or not the catalyst deterioration detection conditions have been satisfied.

If a discrimination is made in step 602 that the catalyst deterioration detection conditions have been satisfied, discrimination flag XCAT is set in step 603 (XCAT←1). If the catalyst deterioration detection conditions have not been satisfied, the discrimination flag XCAT is cancelled in step 604 (XCAT ←0), and this routine is temporarily completed.

Figure 16:
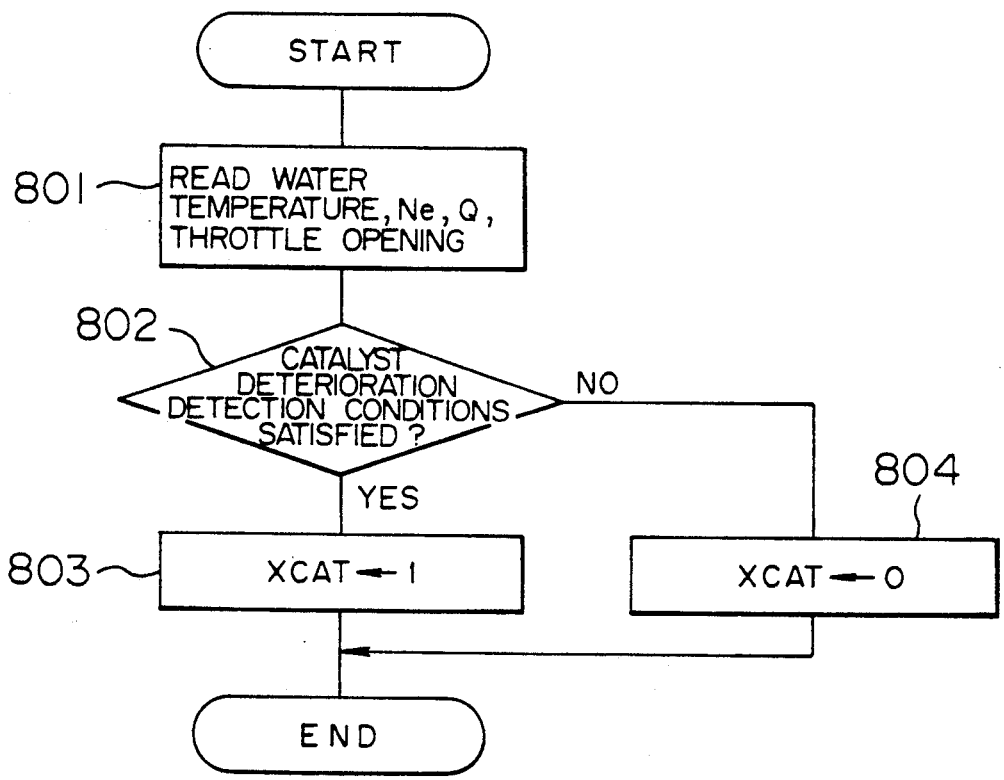
FIG. 16 is a flow chart which illustrates a routine for discriminating a catalyst deterioration detection condition to be performed by a third embodiment of the influence eliminating control process.

In the second embodiment, a process of making FAFM in step 101a shown in FIG. 3 is executed as shown in FIG. 16. In the aforesaid FAFM making process routine, a discrimination is, in step 701, made as to whether or not the discrimination flag XCAT is set, that is, whether or not XCAT=1. If the discrimination flag XCAT is cancelled, that is, if XCAT=0, the flow proceeds to step 102 shown in FIG. 3.

If a discrimination is made in step 701 that XCAT=1, the left bank correction coefficient FAFH is used in place of the right bank correction coefficient FAFM (FAFM←FAFH), and the flow returns to the air/fuel ratio feedback control routine in FIG. 3, and this routine is completed here while omitting an ordinary feedback control from step 102.

Figure 19:
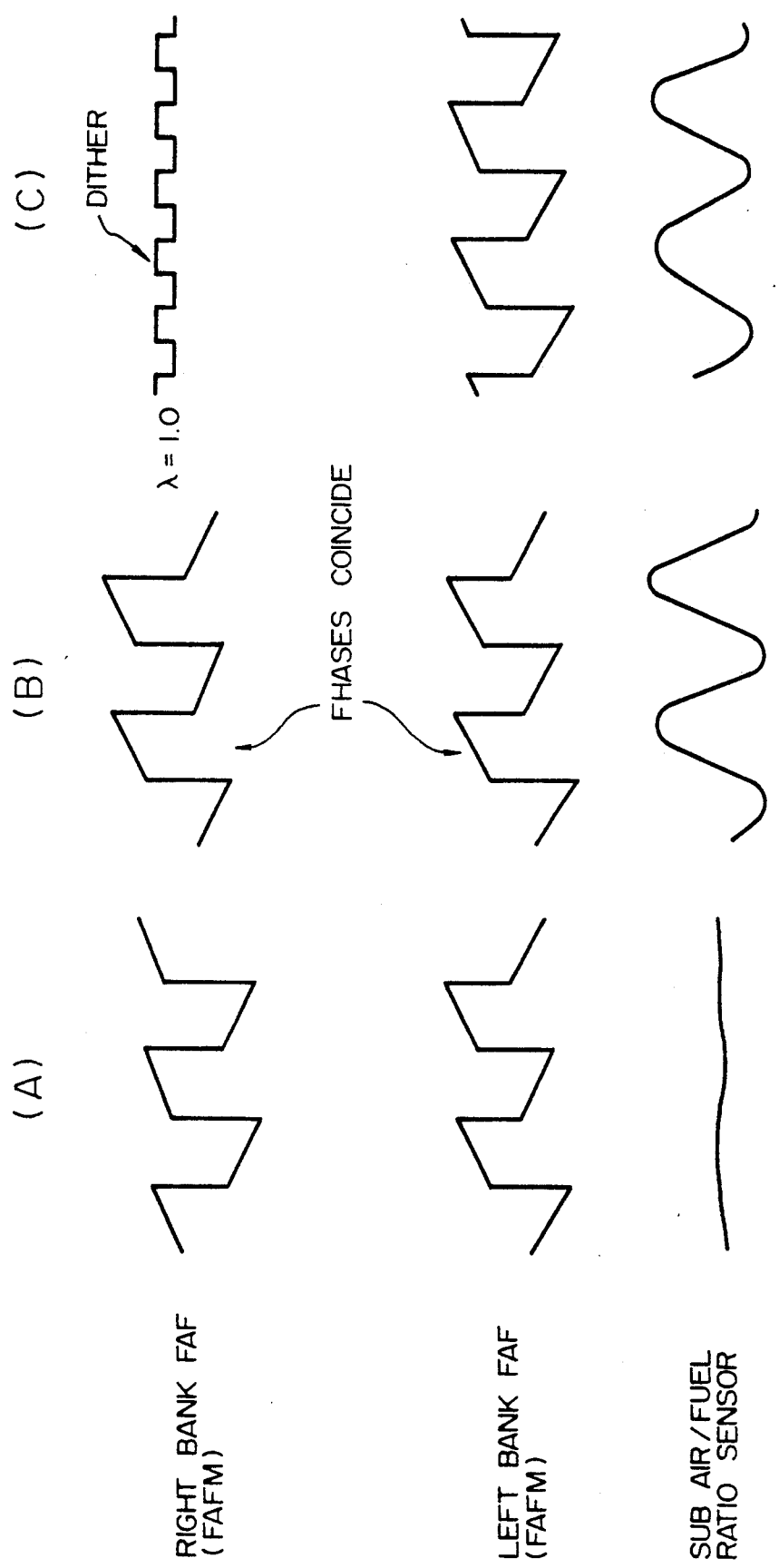
FIG. 19 is a waveform view which illustrates the change of waveforms of the air/fuel ratio correction coefficient FAF in the second and the third embodiment of the influence eliminating control process.

FIG. 19 illustrates the waveform change of the air/fuel ratio correction coefficient FAF realized when the process according to the second embodiment is executed. If the catalyst deterioration detection conditions are not satisfied, the phase of the waveform of the right bank FAF (FAFM) and that of the left bank FAF (FAFH) do not always coincide with each other because the right bank SMB and the left bank SBH are independently feedback-controlled. If the phase of the right FAF and that of the left FAF have become contrary as shown in (A) of FIG. 19, a rich gas and a lean gas are mixed with each other, resulting in a gas having an air/fuel ratio of $\lambda=1$ to be generated. As a result, the waveform detected by the sub air/fuel ratio sensor 25 does not realize amplification.

If the catalyst deterioration detection conditions are satisfied, the phases of the FAF of the two banks SBH and SBM coincide with each other as shown in (B) of FIG. 19. As a result, the same type gas are mixed with each other in such a manner that, if either of them is rich gas also the other is rich gas, and if either of them is lean gas also the other is lean gas. As a result, the waveform can be measured by the sub air/fuel ratio sensor 25. Therefore, the waveform detected by the sub air/fuel ratio sensor 25 is able to assuredly show the change of the air/fuel ratio at the left bank SBH. In accordance with the aforesaid signal, the catalyst deterioration discrimination can be assuredly performed.

Then, a third embodiment will now be described with reference to a flow chart shown in FIGS. 16 and 17. The third embodiment is arranged in such a manner that a dither control is performed so as to cause the right bank correction coefficient FAFM to be swung slightly while traversing a point at which the air/fuel ratio $\lambda$ is 1 so that the influence of the exhaust gas from the right bank SBM is eliminated.

First, a variety of parameters are read in step 801 shown in FIG. 16. In step 802, a discrimination is made as to whether or not the catalyst deterioration detection conditions are satisfied. In a discrimination has been made in step 802 that the catalyst deterioration detection conditions have been satisfied, the discrimination flag XCAT is set (XCAT=1) in step 803. If the catalyst deterioration detection conditions have not been satisfied, the discrimination flag XCAT is cancelled (XCAT=0) in step 804, and this routine is temporarily completed.

Figure 17:
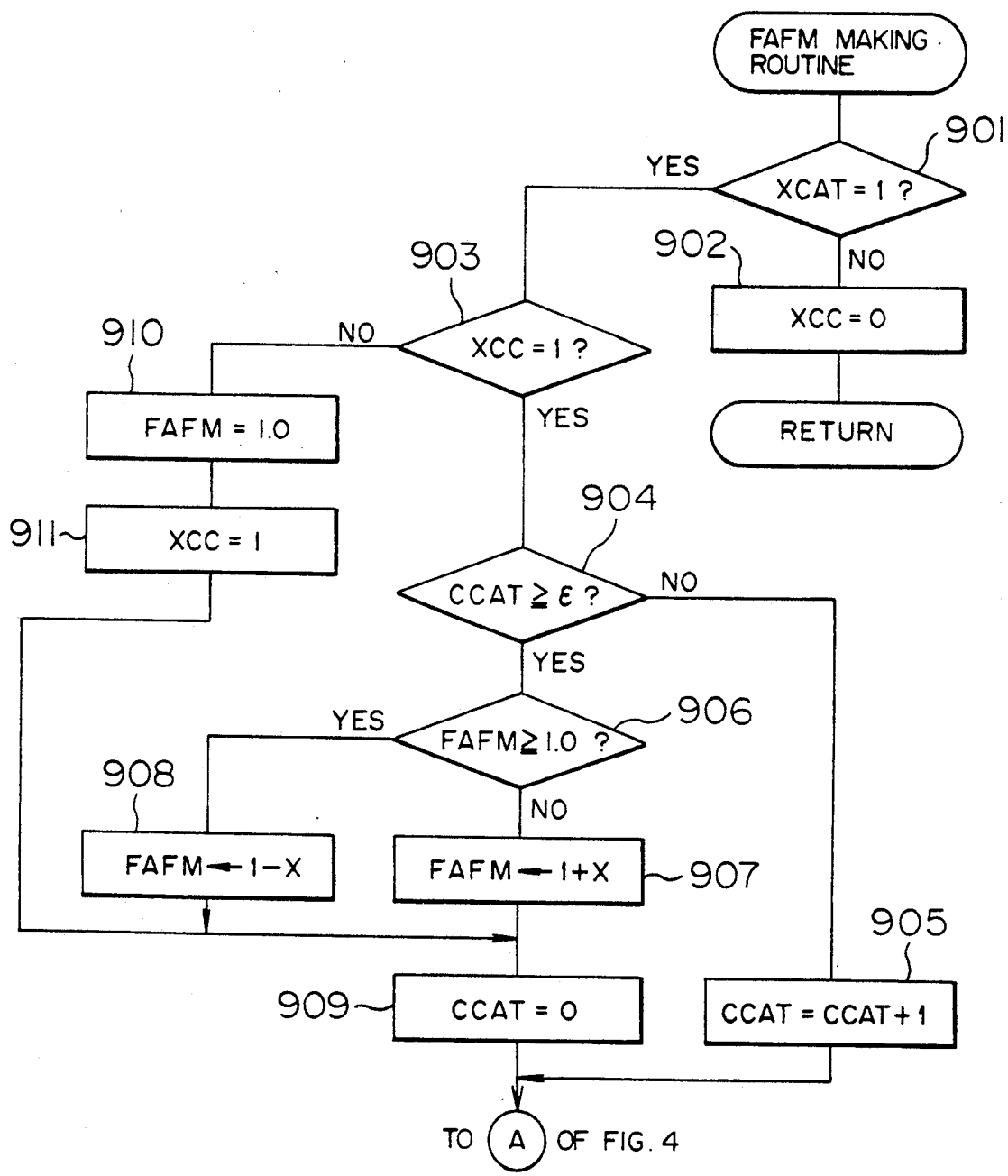
FIG. 17 is a flow chart which illustrates an FAFM making process routine to be performed by the third embodiment of the influence eliminating control process.

In the third embodiment, the FAFM making process in step 101a shown in FIG. 3 is made in accordance with a flow chart shown in FIG. 17. In this FAFM making process, a discrimination is made as to whether or not the discrimination flag XCAT is set, that is, whether or not XCAT=1 is established in step 901. If the discrimination flag XCAT is cancelled, that is, if XCAT=0, a dither discrimination flag XCC is cancelled (XCC=0), and the flow proceeds to step 102 shown in FIG. 3 in which an ordinary feedback control is performed. The dither discrimination flag XCC is a flag for discriminating whether or not the dither control is being performed.

If a discrimination is made in step 901 that the discrimination flag XCAT is set (XCAT=1), a dither control from step 903 is executed. In step 903, a discrimination is made as to whether or not the dither discrimination flag XCC is set. If it has been set (XCAT=1), a discrimination is made as to whether or not the counter CCAT is larger than a predetermined value $\epsilon$. The counter CCAT is a constant for determining the rich time or the lean time in the dither control.

If a negative discrimination is made in step 904, that is, if the counter CCAT is smaller than the predetermined value $\epsilon$, the count of the counter CCAT is increased in step 905, and this routine is temporarily completed. Then, the flow returns to the air/fuel ratio feedback control routine shown in FIG. 3, and the ordinary feedback control from step 102 is not performed, and this routine is completed.

If an affirmative discrimination is made in step 904, that is, if the counter CCAT is larger than the predetermined value e, a discrimination is made whether the right bank correction coefficient FAFM is rich or less. If the right bank correction coefficient FAFM is lean (FAFM<1), it is made to be rich (FAFM←1+X) in step 907. If the right bank correction coefficient FAFM is rich (FAFM≧1), it is made to be lean in step 908 (FAFM←1−X).

In step 909, the counter CCAT is cleared (CCAT=0), and this routine is temporarily completed, and the flow returns to the air/fuel ratio feedback routine shown in FIG. 3. Thus, this routine is completed while omitting the ordinary feedback control from step 102. The predetermined value X to be added to subtracted to and from the theoretical air/fuel ratio (g)=1) in order to make the air/fuel ratio to be rich or lean is set to 0.05≦X≦0.15 in terms of preventing the emission from becoming worse and maintaining driveability.

If a discrimination s made in step 903 that the dither discrimination flag XCC is cancelled (XCAT=0), the right bank correction coefficient FAFM is made to be 1.0 in step 910. Then, the dither discrimination flag XCC is set (XCC=1) in step 911, and the flow proceeds to step 909.

In (C) of FIG. 19 there is illustrated change of the waveform of the air/fuel ratio correction coefficient FAF taken place in the case where the aforesaid process has been executed. Since the right and left banks SBM and SBH are individually feedback controlled before the catalyst deterioration detection conditions are satisfied, the phase of the waveform of the left bank FAF (FAFH) and that of the right bank FAF (FAFM) does not always coincide with each other. If the phase of the right FAF and that of the left FAF are inverted each other, a gas having an air fuel ratio of λ=1 is generated due to maxing of the rich gas and the lean gas as shown in (A) of FIG. 19. Therefore, no amplification is not generated in the waveform to be detected by the sub air/fuel ratio sensor 25.

However, the aforesaid dither control is executed if the catalyst deterioration conditions are satisfied, causing the right bank correction coefficient FAFM to swing slightly while traversing a point at which the air fuel ratio λ=1 as shown in (C) of FIG. 19. As a result, the period of the waveform of the right air/fuel ratio sensor 23 in which the rich state and the lean state are inverted is lengthened. Hence, the influence of the exhaust as from the right bank SBM is eliminated considerably, and therefore the waveform detected by the sub air/fuel ratio sensor 25 is able to assuredly show the change of the air/fuel ratio at the left bank SBH. Therefore, the catalyst deterioration discrimination can be assuredly performed.

It is understood that the present disclosure can be changed variously without departing from the spirit and the scope of the invention.

As described above, according to the present invention, the influence of the change of the air/fuel ratio in an internal combustion engine having a plurality of cylinder banks can be considerably eliminated by reducing the air/fuel ratio correction coefficient at the time of feedback-controlling the air/fuel ratio of the cylinder banks except for a predetermined cylinder bank, or by also using the air/fuel ratio correction coefficient of a predetermined cylinder bank as the air/fuel ratio correction coefficient of the other cylinder banks to cause the phases of the output characteristic changes from all of the main air/fuel ratio sensors to synchronize with one another, or by subjecting the cylinder banks except for a predetermined cylinder bank to a dither control in which the air/fuel ratio is changed relative to a target air/fuel ratio.

Therefore, the change of the air/fuel ratio of predetermined cylinder bank can be accurately detected although only one sub air/fuel ratio sensor is disposed in the lower stream from the catalyst. Therefore, an effect can be obtained in that the deterioration of a catalyst can be assuredly discriminated regardless of the deviation of the phase of controlling the cylinder banks by discriminating the deterioration of the catalyst in accordance with the results of detections Performed by the main air/fuel ratio sensor which correspond to the predetermined cylinder bank and the sub air/fuel ratio sensor.

What is claimed is:

1. An apparatus for detecting deterioration of a catalyst of an internal combustion engine having:
   a plurality of exhaust passages respectively connected to a plurality of cylinder banks;
   a collecting exhaust pipe to which said exhaust passages are joined; and
   a catalyst disposed in said collecting exhaust pipe and capable of purifying exhaust gas, said apparatus for detecting deterioration of a catalyst comprising:
   a plurality of main air/fuel ratio sensors respectively disposed in said exhaust passages;
   a sub air/fuel ratio sensor disposed in the lower stream from said catalyst disposed in said collecting exhaust pipe;
   a feedback control means for executing a feedback control of the air/fuel ratio of each cylinder bank in accordance with the results of detections performed by said main air/fuel ratio sensors and said sub air/fuel ratio sensor;
   deterioration discriminating means for discriminating the deterioration state of said catalyst in accordance with results of detections performed by said main air/fuel ratio sensor corresponding to a predetermined cylinder bank and said sub air/fuel ratio sensor; and
   influence eliminating means which adjusts the air/fuel ratio control quantity at the time of feedback-controlling said air/fuel ratio so as to eliminate an influence of exhaust gas emitted from cylinder banks except for said predetermined cylinder bank of a plurality of said cylinder banks.

2. An apparatus for detecting deterioration of a catalyst of an internal combustion engine according to claim 1, wherein said influence eliminating means reduces air/fuel correction coefficients of said cylinder banks except for said predetermined cylinder bank at the time of feedback-controlling said air/fuel ratio so as to eliminate said influence of said change of said air/fuel ratio.

3. An apparatus for detecting deterioration of a catalyst of an internal combustion engine according to claim 1, wherein said influence eliminating means uses an air/fuel ratio correction coefficient of said predetermined cylinder bank as the air/fuel ratio correction coefficients for the other cylinder banks at the time of feedback controlling said air/fuel ratio so as to cause the phases of said main air/fuel ratio sensors to be synchronized with one another, so that said influence of said change of said air/fuel ratio is eliminated.

4. An apparatus for detecting deterioration of a catalyst of an internal combustion engine according to claim 1, wherein said influence eliminating means subjects said cylinder banks except for said predetermined cylinder bank to a dither control in which said air/fuel ratio is changed relative to a target air/fuel ratio, so that said influence of said change of said air/fuel ratio is eliminated.

* * * * *